(12) United States Patent
Ginder

(10) Patent No.: US 6,581,297 B1
(45) Date of Patent: Jun. 24, 2003

(54) DRYING APPARATUS AND METHOD

(75) Inventor: William F. Ginder, Roanoke, VA (US)

(73) Assignee: Graham-White Manufacturing Company, Salem, VA (US)

( * ) Notice: Subject to any disclaimer, the term of this patent is extended or adjusted under 35 U.S.C. 154(b) by 144 days.

(21) Appl. No.: 09/715,875

(22) Filed: Nov. 17, 2000

(51) Int. Cl.$^7$ .............................................. F26B 21/06
(52) U.S. Cl. ..................... 34/79; 34/80; 34/82; 96/130; 96/141
(58) Field of Search ................ 34/79, 80, 82, 34/472, 480; 96/121, 122, 130, 133, 134, 135, 136, 137, 139, 140, 141; 95/116–121

(56) References Cited

U.S. PATENT DOCUMENTS

| | | | |
|---|---|---|---|
| 3,876,400 A | 4/1975 | Frantz | |
| 4,231,768 A | 11/1980 | Seibert et al. | |
| 4,468,239 A | 8/1984 | Frantz | |
| 4,865,815 A | 9/1989 | Martin et al. | |
| 5,038,815 A | 8/1991 | Palmer | |
| 5,169,412 A | 12/1992 | Prasad et al. | |
| 5,205,842 A | 4/1993 | Prasad | |
| 5,209,764 A | 5/1993 | Eberling | |
| 5,226,932 A | 7/1993 | Prasad | |
| 5,423,129 A * | 6/1995 | Castle et al. ............... | 34/80 |
| 5,604,991 A | 2/1997 | Castle et al. | |
| 5,632,805 A | 5/1997 | Woodard | |
| 5,660,607 A | 8/1997 | Jokschas et al. | |
| 5,662,727 A | 9/1997 | Castle et al. | |
| 5,685,896 A | 11/1997 | Castle et al. | |
| 5,901,459 A | 5/1999 | Trapp et al. | |
| 5,901,464 A | 5/1999 | Kazakis et al. | |
| 5,930,910 A | 8/1999 | Trapp et al. | |
| 5,961,698 A | 10/1999 | Dossaji et al. | |
| 5,983,516 A | 11/1999 | Trapp et al. | |
| 6,004,383 A | 12/1999 | Kühnelt | |
| 6,014,820 A | 1/2000 | Jones et al. | |
| 6,070,339 A | 6/2000 | Cunkelman | |
| 6,126,724 A | 10/2000 | Martin et al. | |
| 6,128,825 A | 10/2000 | Cunkelman | |
| 6,180,168 B1 | 1/2001 | Stookey et al. | |

OTHER PUBLICATIONS

PCT International Search Report, PCT/US01/49954 filed Oct. 24, 2001.

\* cited by examiner

Primary Examiner—Jiping Lu
(74) Attorney, Agent, or Firm—Dority & Manning, P.A.

(57) ABSTRACT

A twin tower gas drying system is disclosed for cleaning compressed air lines in locomotives, buses, transit vehicles and the like by removing undesirable contaminants from an air or gas stream. A multistage filtration process employs a first scrubber that is capable of removing particulate material or soot from a stream of unpurified gas. A pre-filtering means is employed to remove impurities from the stream of unpurified gas. Coalescing filters are us to remove remaining moisture from the gas stream. Two towers of dessicant material dry the gas stream. The drying system is capable of controlling the flow of gas by alternately switching between supplying unpurified gas to a first tower and supplying unpurified gas to a second tower, with a purge cycle in between. Thus, a first dessicant tower is being purged of moisture while the second tower accumulates moisture, and likewise the second tower is purged while the first tower accumulates moisture, in alternating sequence.

12 Claims, 21 Drawing Sheets

DRYING APPARATUS AND METHOD

BACKGROUND OF THE INVENTION

Trucks, buses, locomotives and transit vehicles typically contain compressed air systems that operate brakes and perform other functions such as opening and closing doors, for example. Air that emerges from air compressors in such systems often contains moisture and lubricating oil mist vaporized within the air. Such moisture and oil mist contaminants must be continuously removed from the compressed gas handling system to prevent failure of the system due to build-up of water or sludge in the compressed air lines.

One problem with such air dryers is that particulate material and soot can easily clog the filters of such apparatus, which sometimes causes the filters to crack or break. When filters break, they lose the ability to filter contaminated air. Moisture (water vapor) is considered a contaminant in such systems, and when a filter breaks, unfiltered contaminated gas is allowed to seep through the break, preventing the dryer from operating effectively. In general, removing oil and moisture from a contaminated stream can be a challenging task.

If water or moisture is allowed to build up inside pneumatic air lines in such apparatus, then it is possible that the brakes will fail or alternatively, air actuated pneumatic mechanical apparatus will stop working. On a subway car or a bus, this could mean that the doors will not open or close properly, or the pneumatic load levelers will stop working properly. Many of the components in modern day buses for example, are air driven. It is therefore extremely important to keep moisture and contaminants out of the pneumatic air lines in such systems. Furthermore, oil is a contaminant which degrades and causes further maintenance problems for such pneumatic systems.

It would therefore be desirable to provide a system, apparatus and method for removing contaminants from pneumatic air lines effectively and efficiently. A method of filtration that is capable of removing both the solid particulates, such as soot, and also the contaminants such as entrained oil and water mist is preferred. Furthermore, a method for removing such contaminants which preserves the integrity of the filtration apparatus, and does not undesirably cause filters to fail, would be highly desirable.

SUMMARY OF THE INVENTION

A twin tower gas drying system is shown herein by way of drawings and written description. The invention is capable of several configurations, and a person of skill in the art will recognize that other configurations consistent with this description are possible, and within the scope of the invention.

In the invention, a separation means is employed for removing particulate material from a stream of unpurified gas. Typically, a scrubber pad is used as the separation means, but other means for effecting separation may be employed as well. Additionally, a pre-filtering means is used for removing impurities from said stream of unpurified gas flowing from said separation means. First and second coalescing filters are employed to clean the air, the filters being capable of removing water and oil mist from said stream of unpurified gas flowing from said pre-filtering means. Further, a first tower is provided having a first dessicant material therein for removing water vapor from said stream of unpurified gas received from said first coalescing filter so as to supply a first stream of purified gas therefrom. Furthermore, a second tower having a second dessicant material therein for removing water vapor from said remaining stream of unpurified gas received from the second coalescing filter is provided. Finally, a control means is included for controlling flow of unpurified and purified streams of gases through the drying system so that said drying system is capable of alternately switching between supplying gas to said first tower and supplying gas to the second tower.

In one application of the invention, the drying system includes a control means that operates to supply unpurified gas to the first tower while simultaneously purging moisture from the second tower. Also, depending upon the particular configuration employed, it is also possible to employ control means to supply unpurified gas to the second tower while simultaneously purging moisture from the first dessicant material of said first tower.

In some applications, the separation means is a scrubber pad that is capable of operating in a first mode to entrain particulate material upon its surface, and in a second mode to release entrained material from its surface, such that the entrained material is exhausted from the system. In many applications, the scrubber pad flexes in response to air pressure fluctuations to release entrained particulate material from its surface. Then, the material thus released is flushed from the system.

In some applications, the drying system includes first and second towers with first and second cans loaded with dessicant. The drying system of the first tower comprises a first holding means for containing said first dessicant material within said first can to minimize forces acting against the first can. The drying system of the second tower may comprise a second holding means for containing said second dessicant material within said second can to minimize forces acting against the second can.

In another embodiment of the invention, the apparatus may be adapted for drying a moist air stream. The stream may be dried using a housing and a valve body connected to the housing. Furthermore, a chamber is provided within said valve body. The chamber is adapted for separating moisture from a moist air stream, thereby producing a filtered air stream, the chamber further comprises a pre-filter, a first coalescing filter, and a second coalescing filter. Further, a sump is connected to the chamber. The sump collects and expels separated moisture.

A first tower comprises a dessicant material for removing remaining amounts of moisture from the filtered air stream, thereby producing a substantially dried air stream. Also, a second tower having dessicant material for removing moisture from said filtered air stream is provided.

The apparatus also includes a diverter valve that is provided in operable connection to the valve body for affecting the flow of said air streams, the diverter valve being capable of providing in alternating sequence the filtered air stream to the first and second towers to facilitate the simultaneous movement of air along the dessicant material in said first tower, while air in said second tower is purged from the sump. Then, it is possible to repeat the sequence to facilitate the movement of air along the dessicant material in said second tower while air in said first tower is purged from said sump, with alternating repeating cycles.

The invention also may be characterized as a method for drying a wet gas stream having particulate material therein. In the method, it is possible to provide a particulate-containing wet gas stream. Further, the method includes removing particulate from the wet gas stream, and prefiltering the wet gas stream. The first and second coalescing filters are capable of removing oil and water mist from the prefiltered gas stream, and the output of the first and second coalescing filters comprises a filtered gas stream. Furthermore, a first tower and a second tower are provided, each tower having dessicant material therein for removing wter vapor from said filtered gas stream so as to supply a first stream of substantially purified dry gas therefrom. In some applications of the invention, it is possible to control the flow of said streams of gases to facilitate switching alternately between supplying the filtered gas stream to said first tower, and supplying the filtered gas stream to said second tower.

BRIEF DESCRIPTION OF THE DRAWINGS

A full and enabling disclosure of this invention, including the best mode shown to one of ordinary skill in the art, is set forth in this specification. The following Figures illustrate the invention.

DETAILED DESCRIPTION OF THE INVENTION

Figure 1:
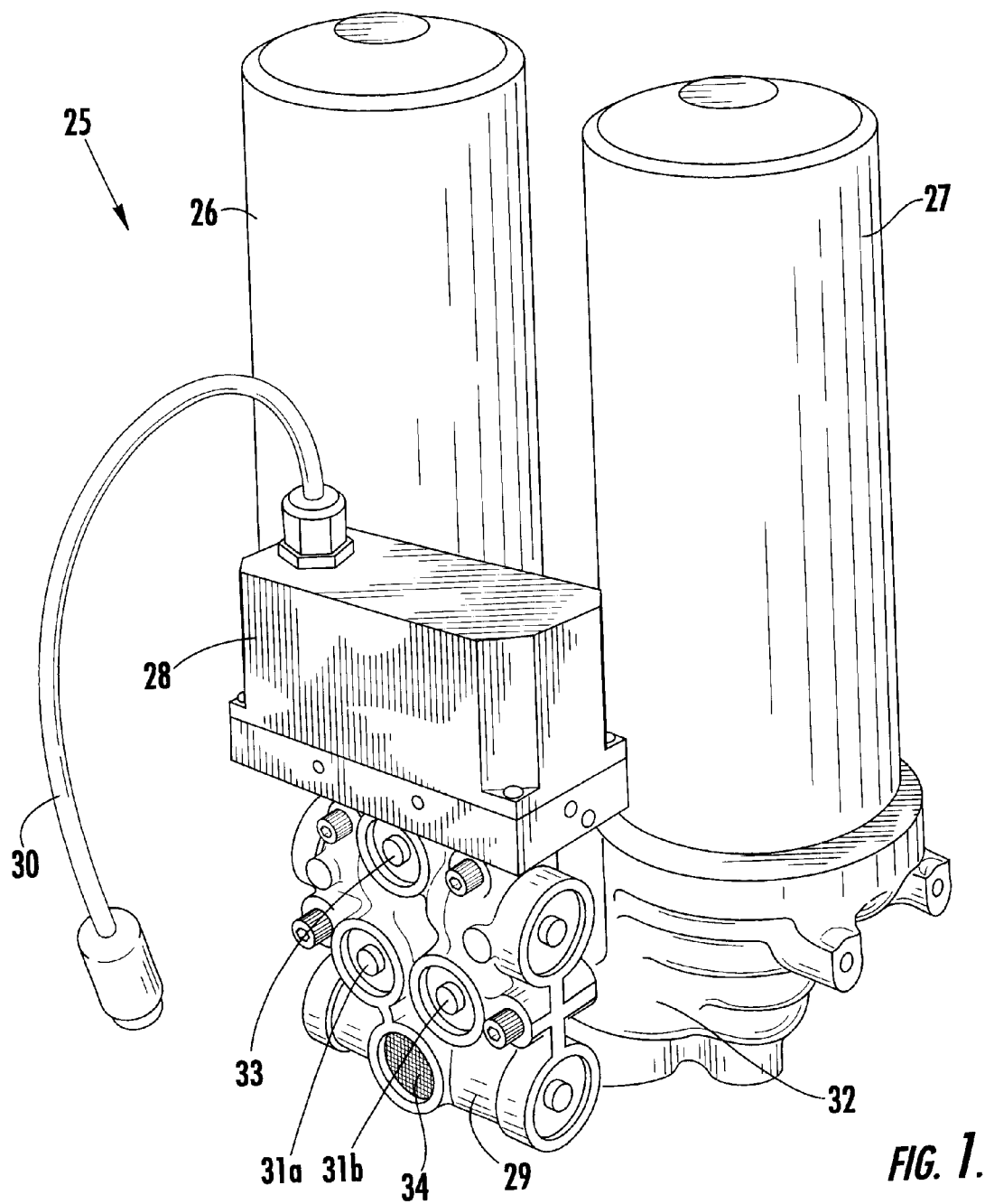
FIG. 1 is a perspective view of the front side of the twin tower air dryer of the invention.

Reference now will be made to the embodiments of the invention, one or more examples of which are set forth below. Each example is provided by way of explanation of the invention, not as a limitation of the invention. In fact, it will be apparent to those skilled in the art that various modifications and variations can be made in this invention without departing from the scope or spirit of the invention. For instance, features illustrated or described as part of one embodiment can be used on another embodiment to yield a still further embodiment. Thus, it is intended that the present invention cover such modifications and variations as come within the scope of the appended claims and their equivalents. Other objects, features and aspects of the present invention are disclosed in or are obvious from the following detailed description. It is to be understood by one of ordinary skill in the art that the present discussion is a description of exemplary embodiments only, and is not intended as limiting the broader aspects of the present invention, which broader aspects are embodied in the exemplary constructions.

Air drying systems are practiced in a variety of technical fields. One such prior art air drying system is a single tower system as illustrated in U.S. Pat. No. 5,423,129. In that patent, a single tower air drying system is disclosed which provides a clean and dry compressed air to a pneumatic system such as a brake system of a railroad train. The system is designed to remove moisture and airborne particulates from a stream of compressed air as the air passes through a dessicant material contained within the single tower.

U.S. Pat. No. 5,901,459 to Trapp et al. is directed to a shuttle valve mechanism for a twin tower compressed air cleaning and air drying system. In that patent, dessicant containing chambers form a closure with a slide valve chamber which contains a reciprocal valve member with passageways interconnecting the two ends of a slide valve chamber with two dessicant containing chambers. A reciprocal valve member is provided with an aperture to permit a purge percentage of the air dried in one chamber to be admitted into the other chamber to effect a purge cycle whereby the purge percentage will remove moisture from the dessicant.

A further U.S. Pat. No. 5,662,727 to Castle et al. is directed to a twin tower gas drying system for filtering unpurified gas and supplying purified gas to a pneumatic system. The drying system includes a separator, two coalescers, two dessicant towers, and a mechanism for controlling flow of unpurified and purified gasses through the system. In the Castle patent, the separator separates moisture and other particulates from the unpurified gas. Each coalescer removes moisture remaining within the unpurified gas. Furthermore, a purge system controls the flow in the drying system to alternately extract moisture from unpurified gas passing through the first coalescer and tower to a second coalescer and tower.

Turning now to FIG. 1, a twin tower dryer 25 is shown having a first tower 26 and a second tower 27. The towers, which are sometimes referred to as "cans", or "canisters" contain a dessicant material that is used in the final stages of the gas drying. On the front of the twin tower dryer 25 is an electronic control box 28, which comprises a control means that operates to supply unpurified gas to the first tower while simultaneously purging moisture from the second tower. This alternating sequence will be discussed further below.

A valve module 29 is located below the electronic control box 28, and the valve module 29 connects by several air flow passageways to the housing 32 of the twin tower dryer 25. A power supply cord 30 is shown coming from the back of the electronic control box 28. On the valve module 29, two outlet check valves 31a and 31b are seen in a paired configuration directly above the drain 34. When moisture and other material is removed from the gas in the course of the gas drying process of the invention, water is expelled from the system by way of drain 34. A sump is located immediately behind the drain 34, but is not visible in FIG. 1. An inlet check valve 33 is located above the two outlet check valves 31a and 31b.

Figure 2:
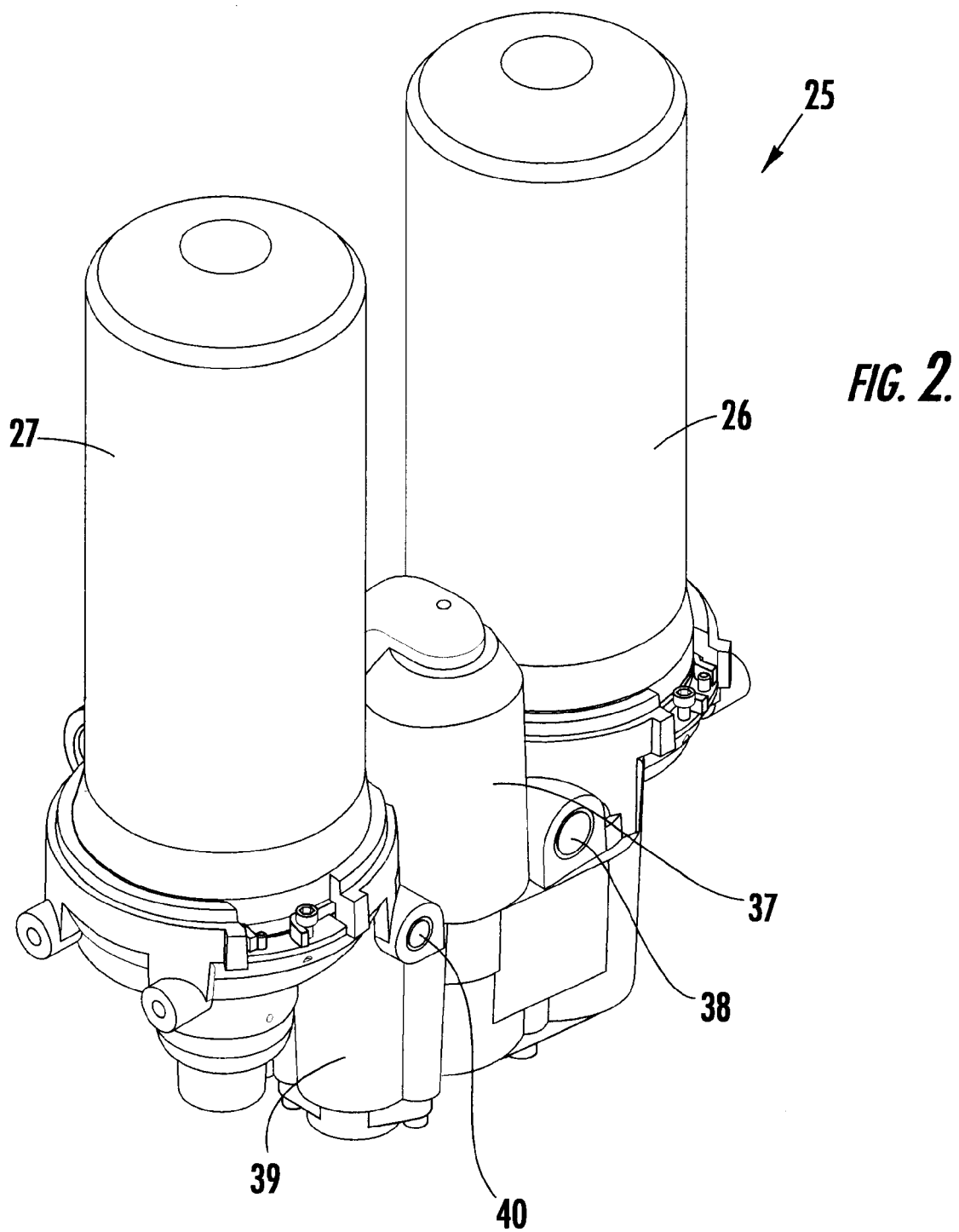
FIG. 2 shows the backside of the air dryer in perspective view.

FIG. 2 shows the back side of the twin tower dryer 25 in perspective view. The first tower 26 and second tower 27 are located on either side of the casting 37. An inlet 38 is provided for the input of wet gas from a pneumatic line of a bus, subway vehicle, or other industrial machinery from which gas is extracted to be dried. A compressor unload signal port 40 is also located on this side of the twin tower dryer 25, and the dryer base 39 forms the base housing that surrounds the lower portion of the dryer.

Figure 3:
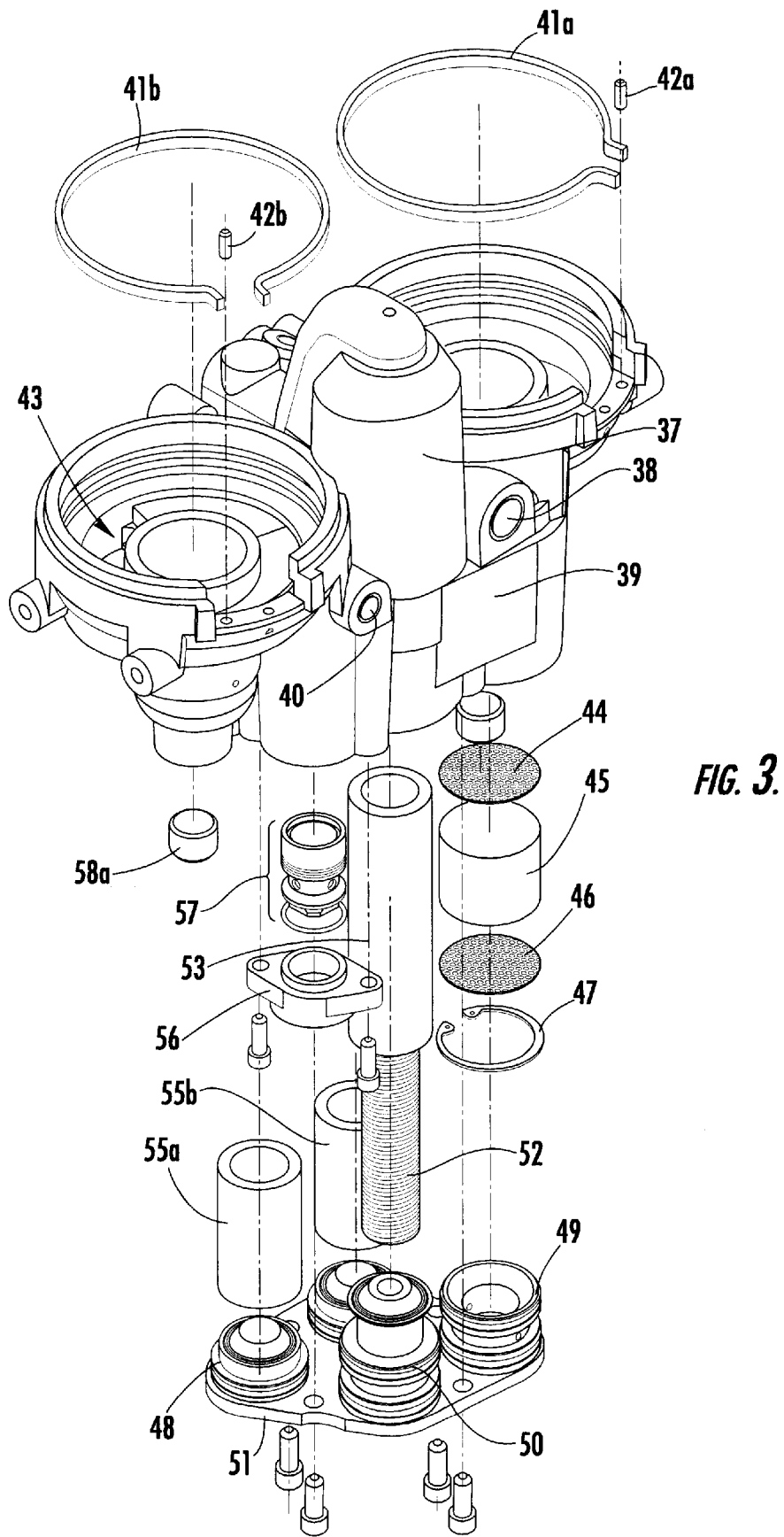
FIG. 3 depicts an exploded view of FIG. 2, revealing a portion of the inner filtration apparatus of the air dryer.

In FIG. 3, the first of several exploded views is provided to show the arrangement of components within the dryer. First, starting at the top of FIG. 3, canister locking rings 41a and 41b are provided for locking the tower canisters 26 and 27 upon the casting 37. Spring pins 42a and 42b are used to provide this locking mechanism. A port 43 provides an outlet for gas to enter the canister (canister not shown in FIG. 3). Contaminated air that enters the inlet 38 is passed downward through the perforated disk 44 and into the scrubber pad 45. The scrubber pad is the first filtering system which removes the macroscopic and large particles of soot, debris, and other materials which have contaminated the gas in the pneumatic lines. In some applications, the scrubber pad is adapted to operate in a two stage configuration, that is, a first mode in which it is receiving soot particles on its surface and filtering the air, and a second stage in which air pressure forces the scrubber pad 45 to flex, or bend, breaking the soot particles from its surface to be washed from the system. The scrubber pad 45 is flexed or bent and squeezed by a high air flow which is caused by an air surge from the unloader valve which occurs during the cycle of the air dryer as described further below. This air surge flexes the scrubber pad 45, causing it to drop from its surface soot and other large particles which are then blown out through the exhaust system. This will be further discussed below. Then, the air passes to a perforated disk 46, which is held by retaining ring 47. Clearly, other types of separation means can be used to filter out or remove the macroscopic particles of soot and debris, and this invention is no way limited to the particular orientation and device shown as scrubber pad 45.

A scrubber sump cap 49 is located near the bottom of the assembly, and it rests upon the filter scrubber cover plate 51. The air proceeds through holes in the scrubber sump cap 49, and moves past the prefilter drain cap 50 and then passes through the prefilter 53. Prefilter 53 is held erect by a filter wire support 52, shown on its inner surface. The prefilter 53 removes impurities form the air stream of unpurified gas which is flowing from the separation means scrubber pad 45. Air then passes to the first and second coalescing filters 55a and 55b. At this point, the air stream has been divided into two pathways, one which proceeds to the first coalescing filter 55a, and a second which proceeds to the second coalescing filter 55b.

Also seen in FIG. 3 is an unloader end cap 56 which holds the exhaust cartridge 57 within the casting 37 of the dryer base 39. A pipe plug 58 is shown extending form the bottom of the dryer base 39, where it attaches.

Figure 4:
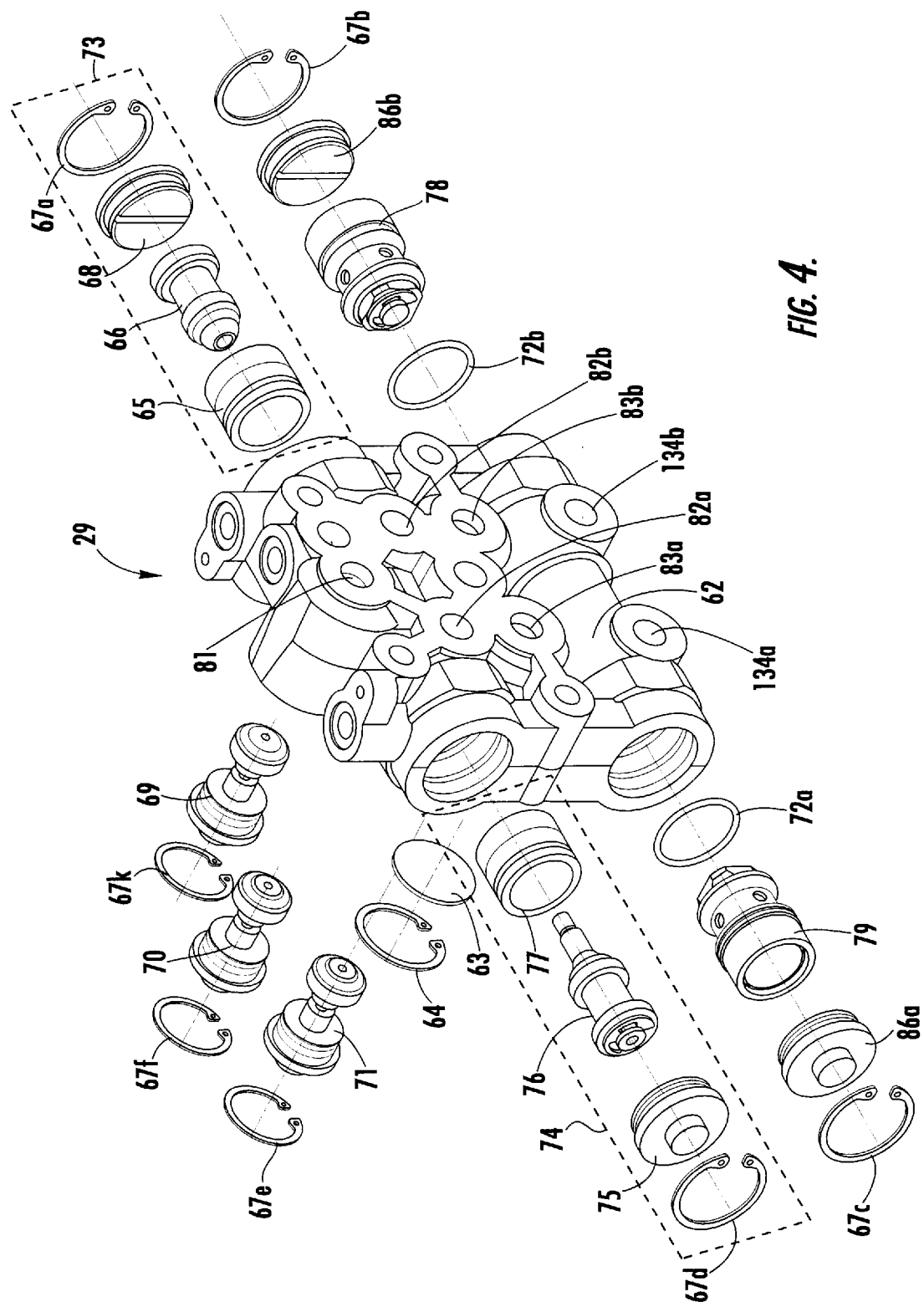
FIG. 4 shows the inner surface of the valve module portion of the air dryer.

FIG. 4 shows an exploded view of the valve module 29 of the invention. An exterior housing 62 encloses several different valves, and will be described. First, a first diverter valve assembly 73 and a second diverter valve assembly 74 are shown where they enter from opposite sides of the valve module 29. The diverter valve assemblies are surrounded by dotted lines as shown on FIG. 4. The first diverter valve assembly 73 comprises a diverter spool 66 which is surrounded by diverter sleeve assembly 65, and lies adjacent to end cap 68, which is held by retaining ring 67a. Likewise, the second diverter valve assembly 74 includes a diverter spool 76 with diverter sleeve assembly 77 on one side, and the end cap 75 on the other side. A retaining ring 67d holds the assembly within the valve module 29.

On the back side of the valve module 29, an outlet bleed check valve 70 and outlet bleed check valve 71 are shown. The outlet bleed check valves are held in place by retaining rings 67e and 67f, as shown in FIG. 4. Furthermore, on the lower back side of the valve module 29, an exhaust muffler assembly 63 is held in place by retaining ring 64. In this portion of the valve module 29, exhaust particle and moisture are expelled form the system. Inlet check valve 69 is held in place by retaining ring 67k.

The valve module 29 further includes in its lower edge a pair of opposed exhaust valves, that is, first exhaust valve 78 and second exhaust valve 79 which hold between them a sump cavity, shown in later Figures. The first exhaust valve 78 is sealed with an O ring 72b and held in place by end cap 86b and retaining ring 67b. Likewise, the second exhaust valve 79 is sealed by way of O ring 72a, and is held in place by end cap 86a which is held by retaining ring 67c. The openings on the side of the valve module 29 include a centrally located air input 81 which receives air from the dryer base. Furthermore, two other pairs of openings are present, including the air output port 82a and 82b. Another pair of openings include air return ports 83a and 83b, which carry return air from the center tube of the dessicant cans back into the valve module 29.

Figure 5:
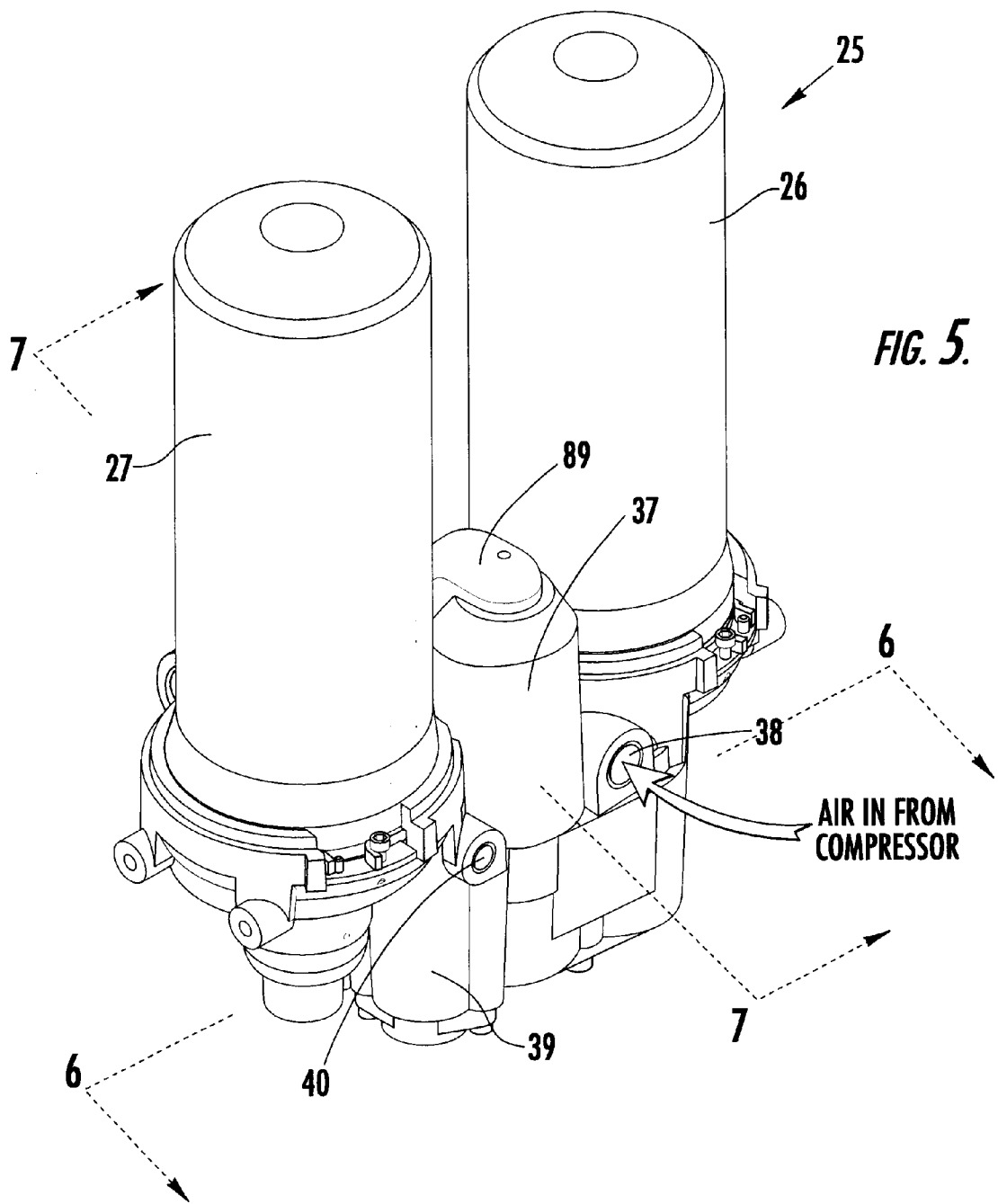
FIG. 5 is a view showing the air input into the air dryer from a pneumatic line.

FIG. 5 is a perspective view similar to that shown in FIG. 2. It shows the air input from the compressor which is the input point for unpurified air. Furthermore, a top housing 89 is seen located directly between the first tower 26 and the second tower 27.

Figure 6:
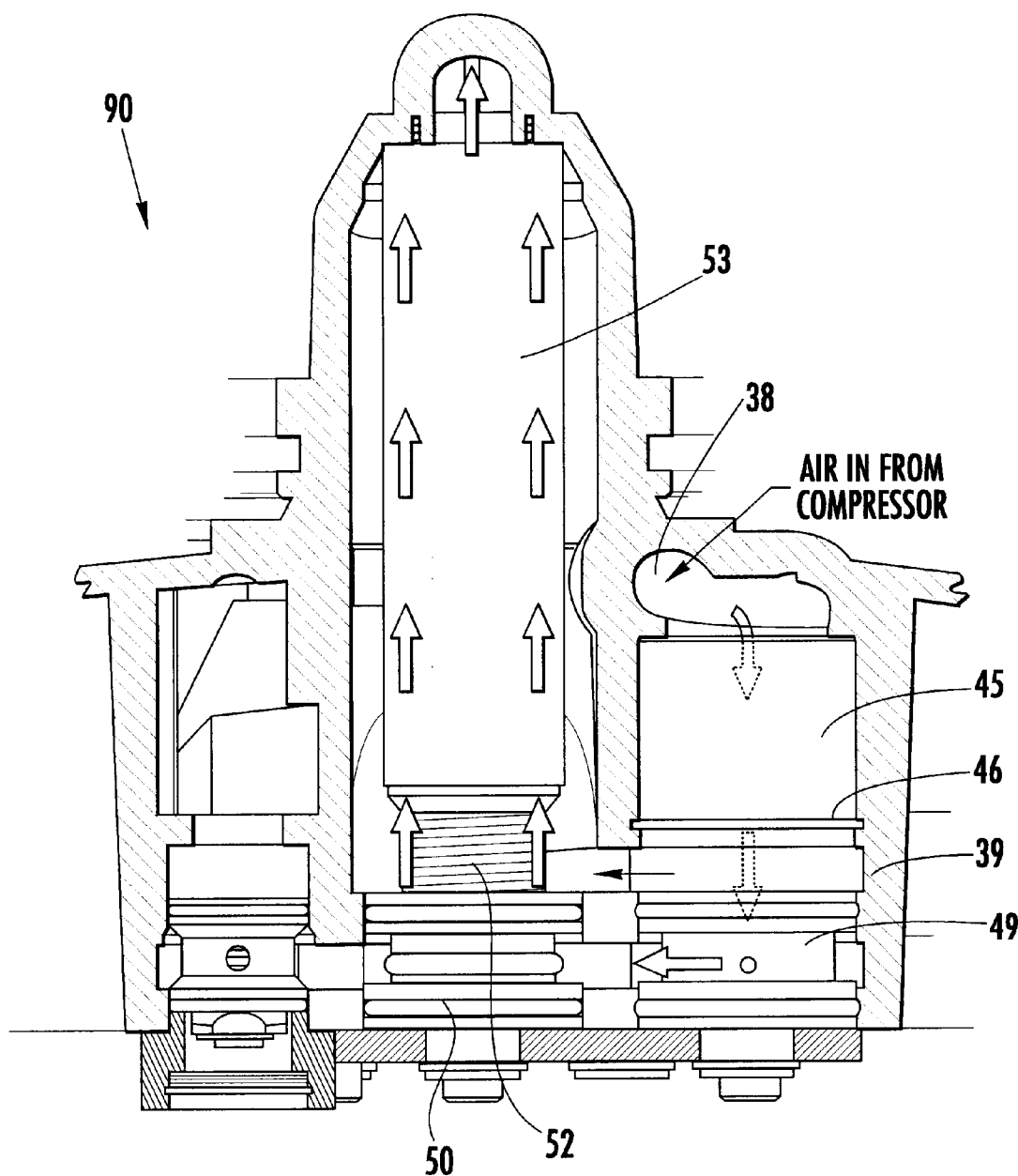
FIG. 6 shows a cross-sectional view of the dryer base only taken along lines 6—6 as shown in FIG. 5, showing air flow.

FIG. 6 is a cross-sectional view of the dryer base only, without the towers attached, taken along lines 6—6 of FIG. 5. The arrows indicate the direction of air flow. The unpurified "dirty air" comes in from the pneumatic lines which are connected to a compressor in most pneumatic air systems. In fact, the compressor is a source of much of the contamination, such as fine oil mist and other airborne particles. The air moves down through the scrubber pad 45 and beyond the perforated disk 46, above the scrubber sump cap 49 and into the prefilter 53 as previously described. The air moves upward along the outside of the prefilter 53, through the wall of prefilter 53, and into the central cavity or hollow cavity within the prefilter 53. Then, the air exits the top of the prefilter and proceeds through the system. The compressor unloader valve 57 is seen in the Figure. FIG. 6 shows a cross-section of the interior of the dryer base.

Figure 7:
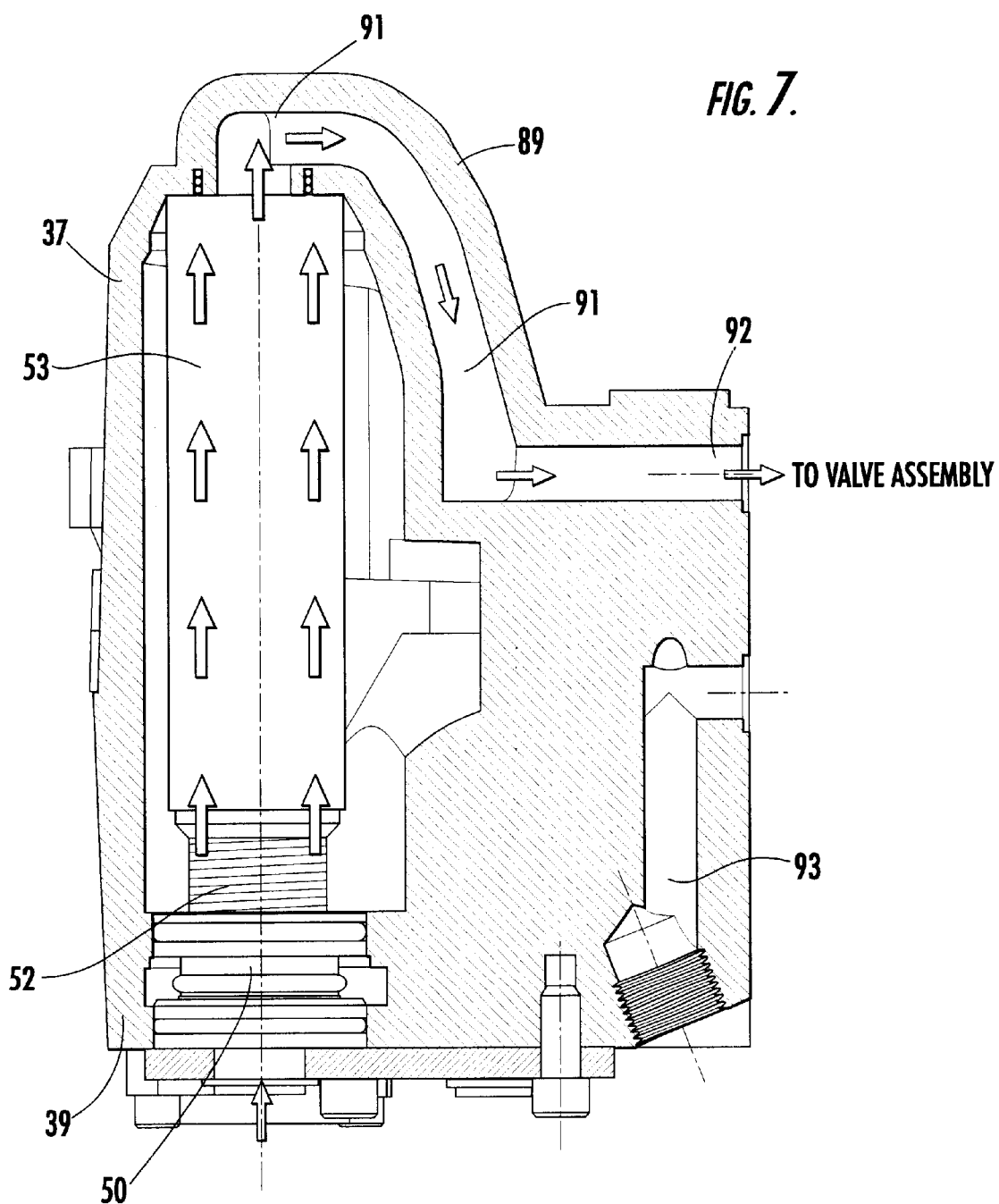
FIG. 7 is a cross-sectional view of the dryer base in another direction taken along lines 7—7 of FIG. 5, showing air flow.

In FIG. 7, it may be seen that once air leaves the prefilter 53 it travels into internal port 91 which takes the air back to the valve assembly. In FIG. 7, the back port 93 is also seen, which is a port that provides a conduit for dry air to return to the pneumatic line of the system, once the air has been thoroughly cleaned by the air dryer. FIG. 7 is a cross-sectional view of the dryer base taken along lines 7—17 of FIG. 5.

Figure 8:
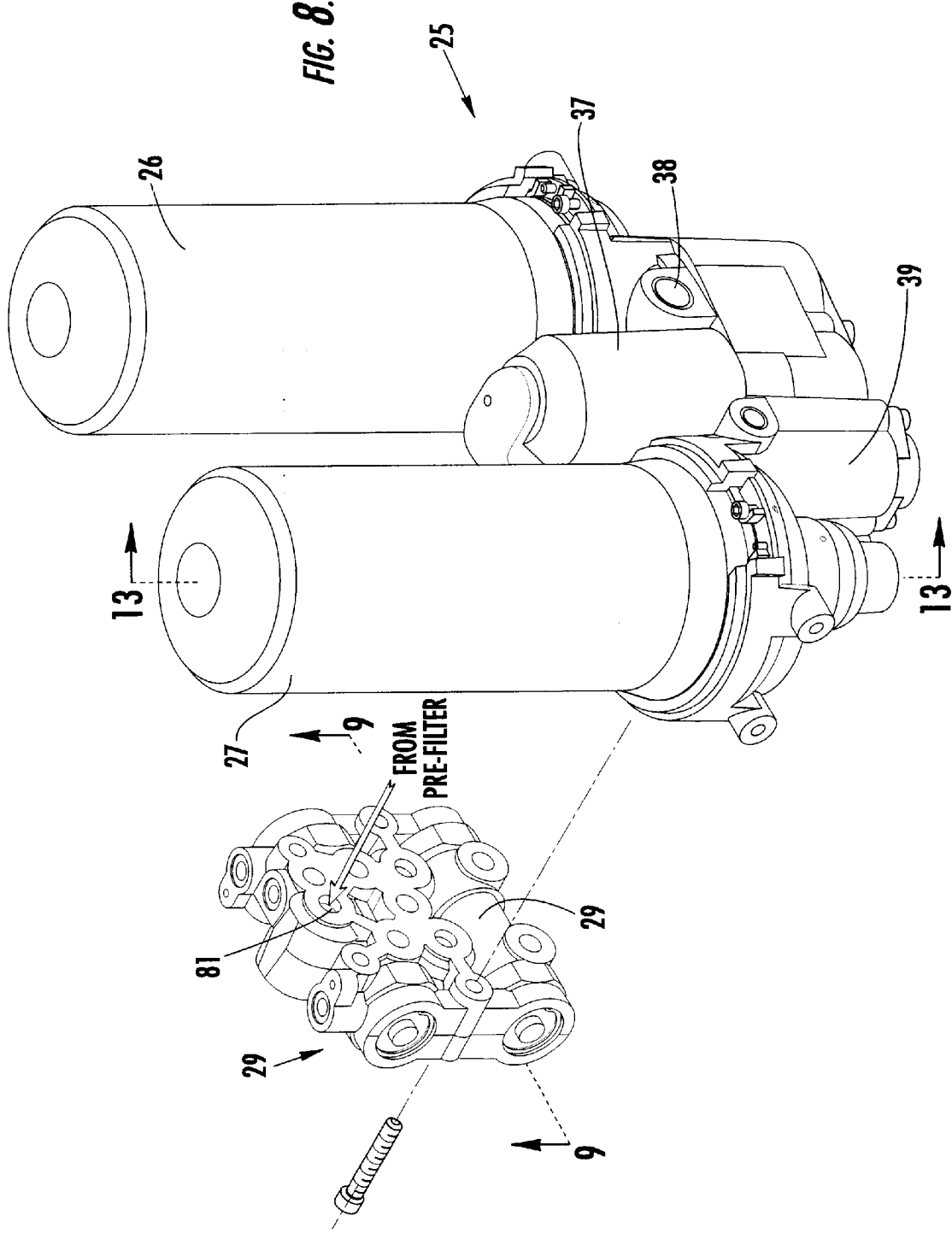
FIG. 8 shows a perspective view as in FIG. 2, except that the valve body has been exploded and removed from the dryer base to show the air input into the valve body from the dryer base.

In FIG. 8, a perspective view of the dryer system is shown with the valve body exploded out and removed from the dryer base 39. FIG. 8 shows the flow of air from the prefilter 53 where it then enters the air input 81 of the valve module 29.

Figure 9:
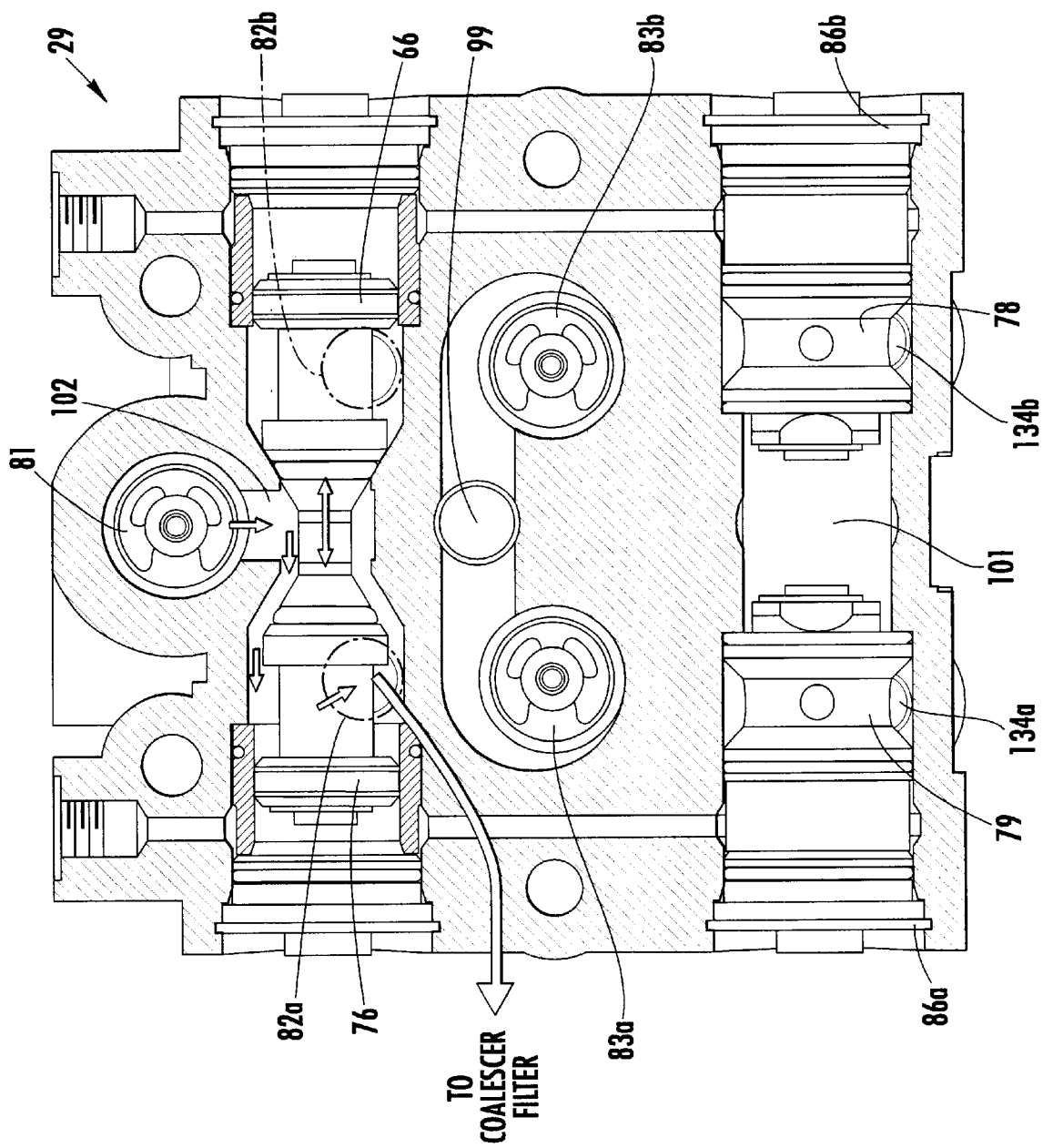
FIG. 9 is a cross-sectional view of the valve body taken along lines 9—9 of FIG. 8, showing air flow out of the valve body, and back into the dryer base to the coalescent filters.

In FIG. 9, a cross-section of the valve module taken along lines 9—9 of FIG. 8 is shown. In this Figure, the inner structure of the valve module can be seen, and diverter 76 and diverter spool 66 which comprise the main portions of the first and second diverter valve assemblies. These valves oscillate back and forth from left to right as shown in FIG. 9, to open and close, changing the path of air flow. The air output ports 82*a* and 82*b* are also shown in dotted lines, and they are located directly behind the diverter spool 76 and diverter spool 66. The air output ports 82*a* and 82*b* provide exit for the air from the valve module 29 to the coalescer filters of the dryer base 39. There are two pathways for air flow, one which proceeds to the coalescer filter 55*a* and another which proceeds to the coalescing filter 55*b*. Also shown in FIG. 9 is a the air return port 83*a* and air return port 83*b*, which connects to cavity 99. Near the lower portion of FIG. 9, the exhaust valve assemblies are shown. That is, first exhaust valve 78 is shown on the right and second exhaust valve 79 is shown on the left. In between the exhaust valves is the sump 101, which serves as a collection point for water and soot particles that are to be expelled from the system periodically. The exhaust valve assemblies are held in place by cap 86*a* and 86*b*, respectively. In FIG. 9, the diverter spool 76 is in the open position, which allows air to proceed along the path of the arrows towards the left of FIG. 9, past the valve. To the contrary, the diverter spool 66 is shown in a position in which it is pushed as far to the left as possible in FIG. 9, so that there is no air flow beyond the diverter spool 66, and it is shut. These diverter valves oscillate such that one valve is open for a period of time, and then the other valve is open for another predetermined period of time in alternating fashion. In that way, air is provided to one coalescing filter or the other, but not to both at the same time.

Figure 10:
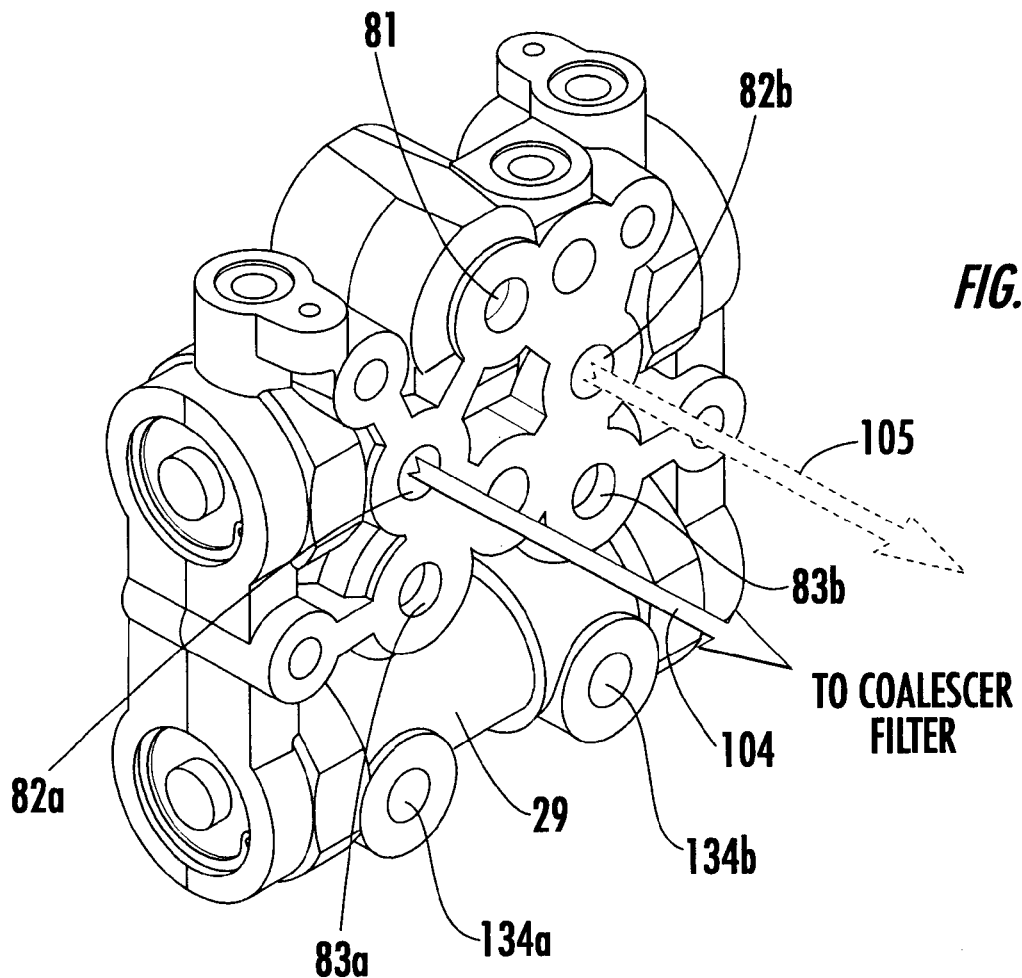
FIG. 10 shows a perspective view of the valve body with air flow direction shown.

FIG. 10 is a perspective view of the valve body 29 which shows the air leaving the valve body along air output port 82*a* and air output port 82*b* traveling to the coalescer filters. Thus, air proceeds along the air flow direction 104 to the coalescer filter 55*a* for a certain period of time, for example maybe about 60 seconds and then that air flow is stopped and then the position of the diverter valve is changed so that the air then proceeds along air flow direction 105 to the coalescing filter 55*b* for a period of time. Usually, this period of time would be the same as the first period of time, i.e., about 60 seconds, and then the diverter valves actuate, causing the air flow to again shift back along air flow direction 104. This alternating sequence of air flow facilitates and allows the air to be exhausted from one side of the twin tower system, while it is being filtered and cleaned by the other side of the system. In operation, the air drying receives from an air compressor (not shown) a supply of air which typically contains an unacceptably high amount of moisture and other particulates suspended therein. The air is filtered several times as described, and then as will be described below, the air eventually reaches the dessicant material. Dessicant plays a key roll in cleaning the air by absorbing moisture. The filters remove particulates before the air enters the desiccant as the air moves radially into and through the dessicant material.

Figure 11:
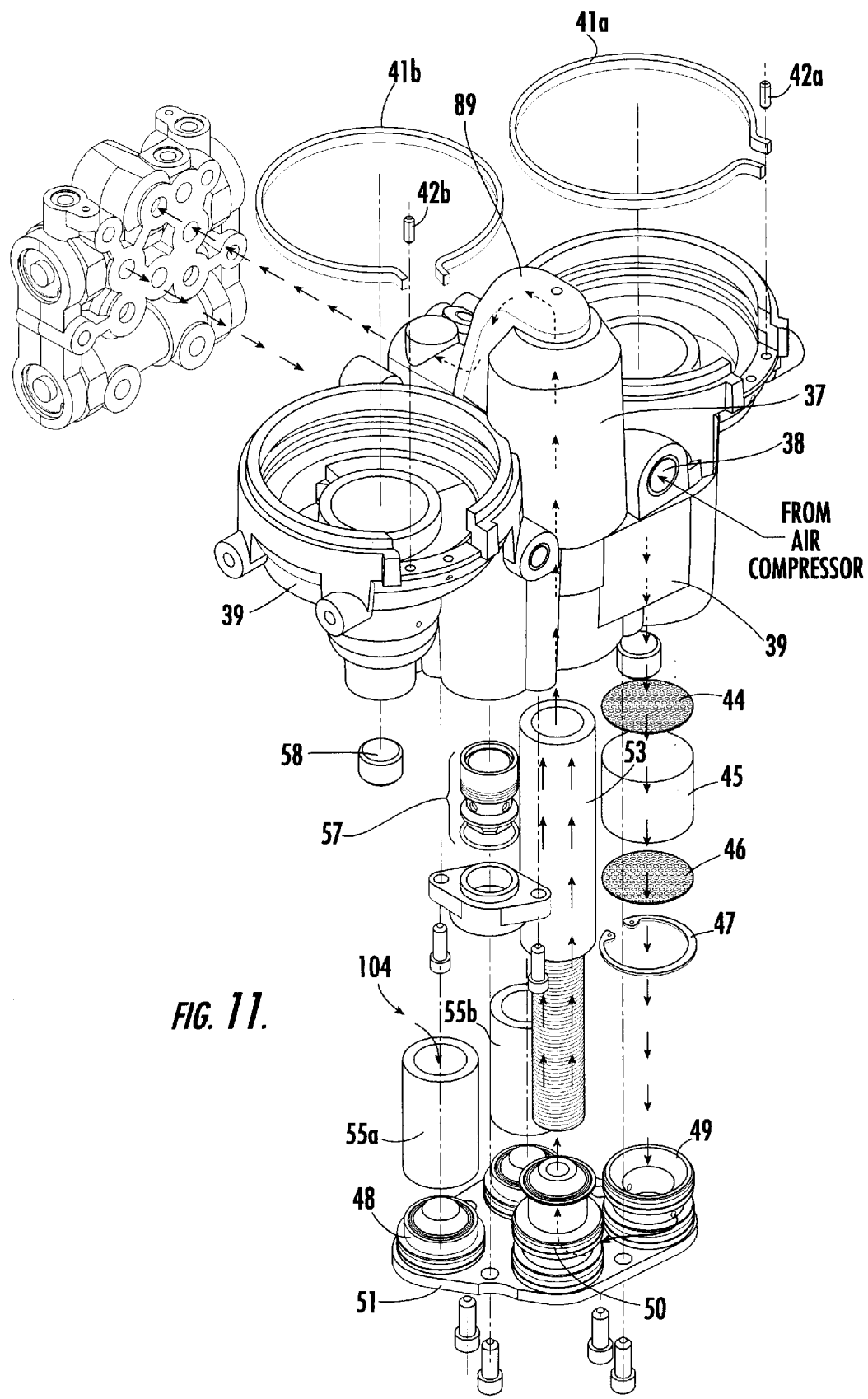
FIG. 11 is a further exploded view of the air dryer base and valve body showing an air flow pathway.

FIG. 11 shows essentially the same exploded view of dryer base 39 seen previously, except that it also contains direction arrows showing the flow of air through the system. Air is passed through the separation means (i.e., the scrubber pad 45), a prefiltering means, which may include prefilter 53, and then along a port in the top housing 89 to the valve module, and then returns from the valve module as shown in FIG. 11. Once the air reaches a coalescing filter, such as coalescing filter 56*a* it proceeds upward as shown in the arrows in FIG. 12 into the second tower 27. The system is symmetrical, that is, a similar pathway exists from coalescing filter 55*b* up into the first tower 26, which is not shown in FIG. 12. The air proceeds through ports, such as port 43 in the housing and then proceeds radially along an annular pathway upwards into the second tower 27 along a dual air path 108 (an annular air path).

Figure 12:
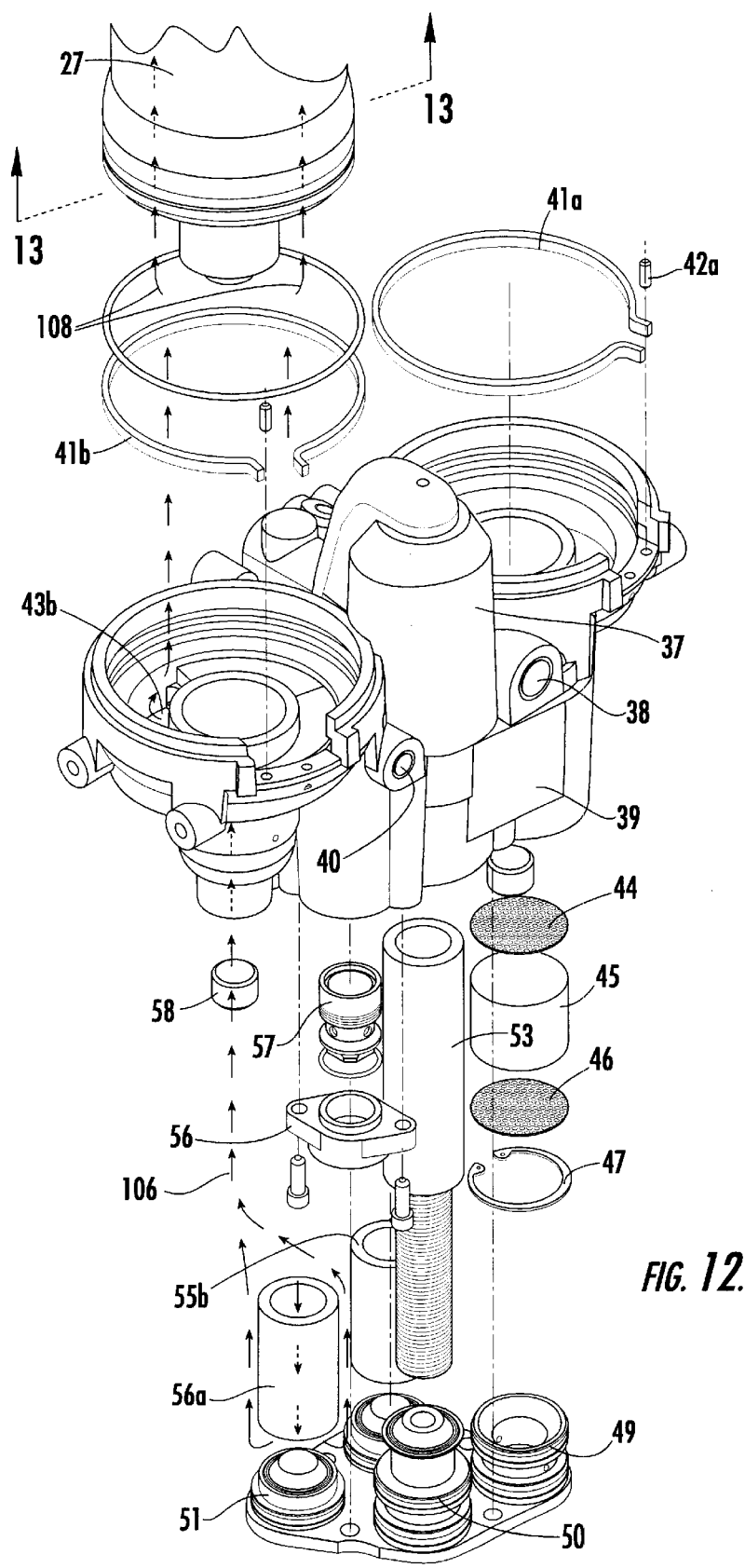
FIG. 12 shows an air flow pathway from one of the coalescing filters up into the tower.
Figure 13:
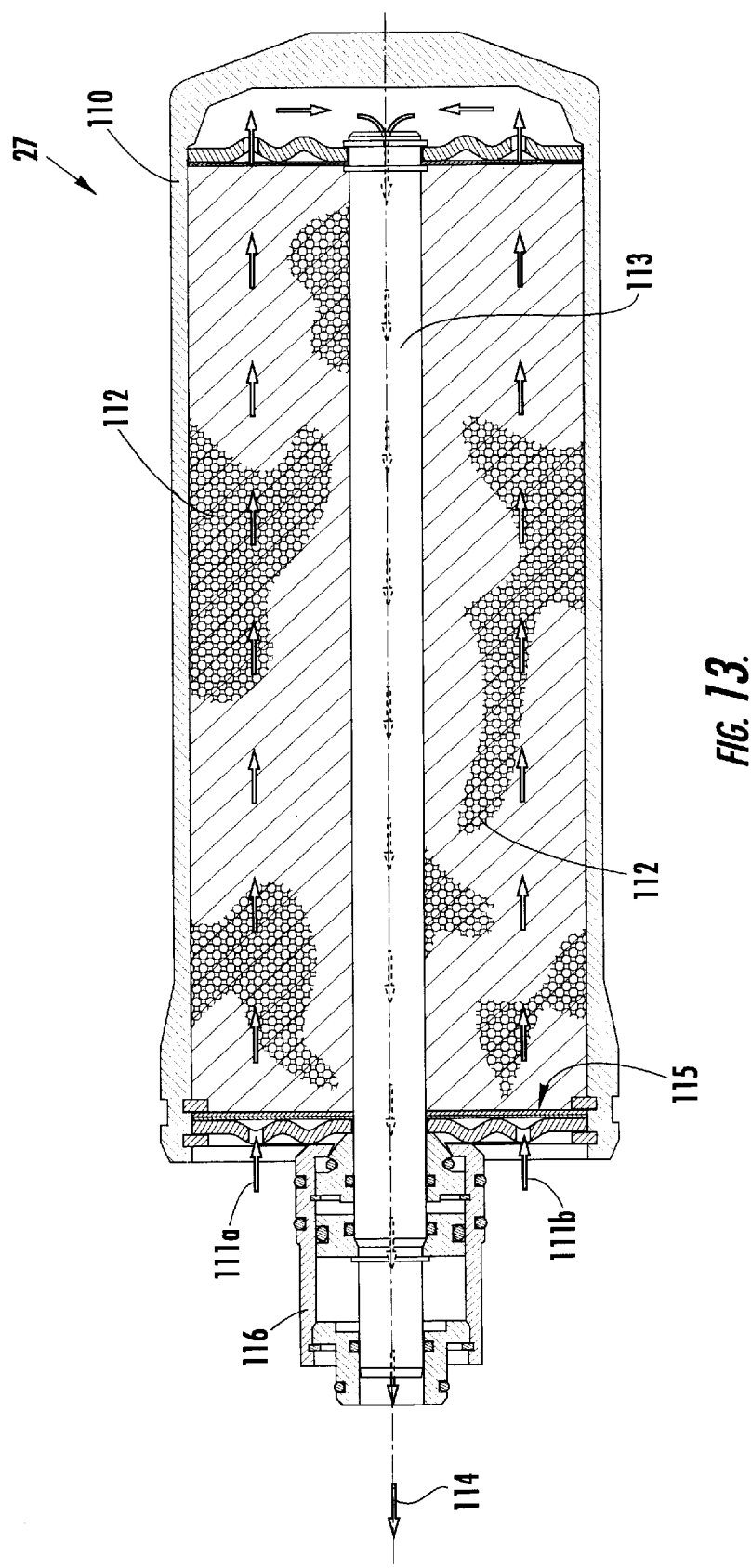
FIG. 13 is a cross-sectional view of a tower containing dessicant to dry the air.

FIG. 13 shows a cross-section of the second tower 27 as taken along the lines 13—13 of FIG. 12. A second tower 27 is shown in cross-section, with a housing can 110 containing dessicant 112 within the housing can 110. The air flow 111*a* and 111*b* enter the second tower 27 is shown by the direction arrows in the figure. A support disk 115 is shown near the base of the second tower 27. A compactor assembly 116 is shown on the left side of the Figure, and the flow of air is generally through the porous base portion radially upward into the second tower, and back down the center tube 113 as shown by the arrows in the Figure. The air flow 114 exits the housing as shown.

Figure 14:
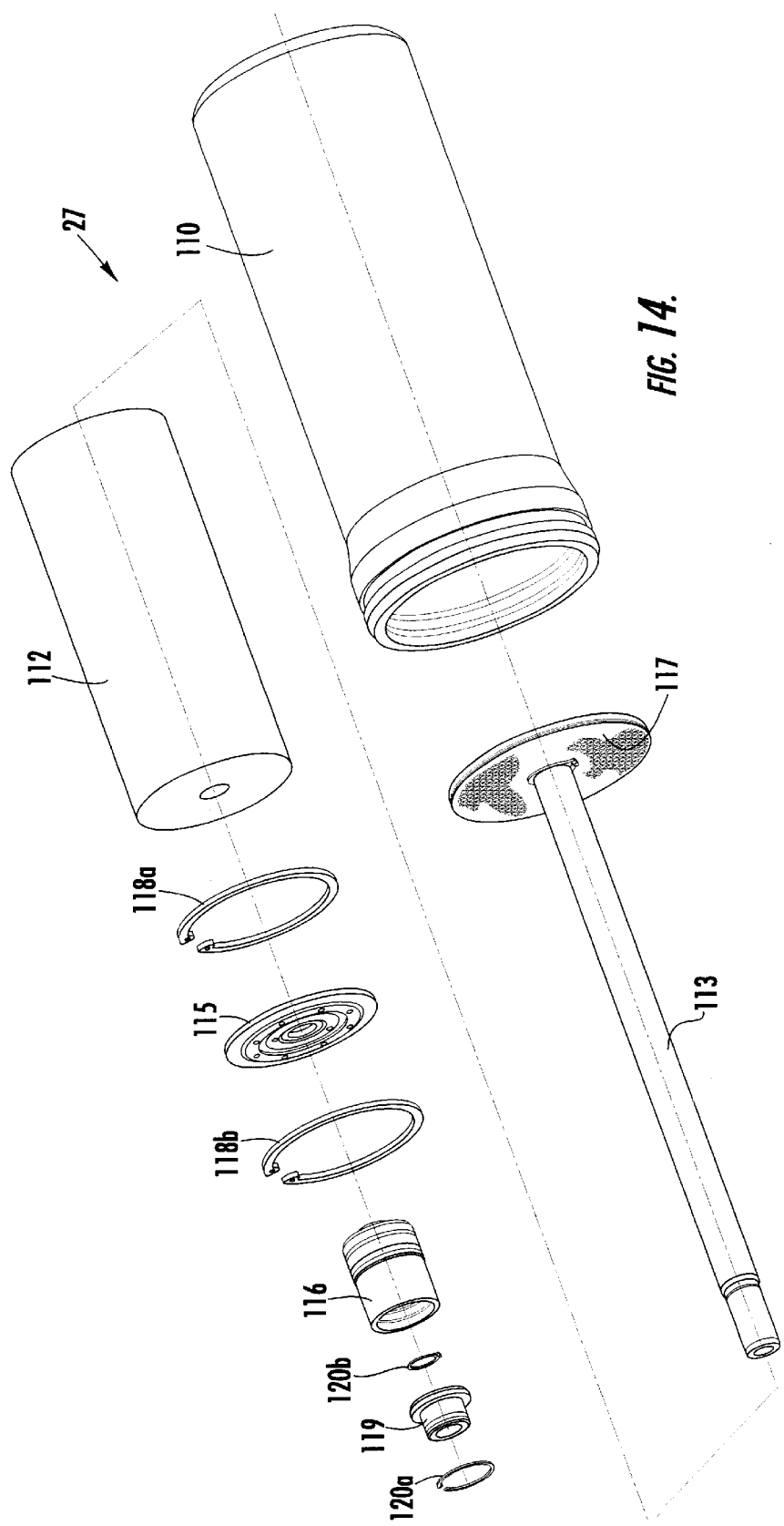
FIG. 14 is an exploded view of the tower including the dessicant can, and its components.

In FIG. 14, the housing can 110 is shown in exploded view, with parts separated for easy identification. A plate 117 is attached to a center tube 113 and is capable of holding the dessicant within the can. One advantage of the invention of this application is that the cannister or can is not "end loaded" such that the dessicant in this invention is squeezed between the plate 117 and the support disk 115 (shown in FIG. 13) such that the assembly may be easily disassembled when necessary to re-load the dessicant, or for other reasons. The dessicant charge 112 is shown in FIG. 14, and retaining rings 118*a* and 118*b* are shown on either side of support disk 115. The compactor assembly 116 is retained on the unit by retaining rings 120*a* and 120*b*, with an end cap assembly 119 shown in FIG. 14.

Figure 15:
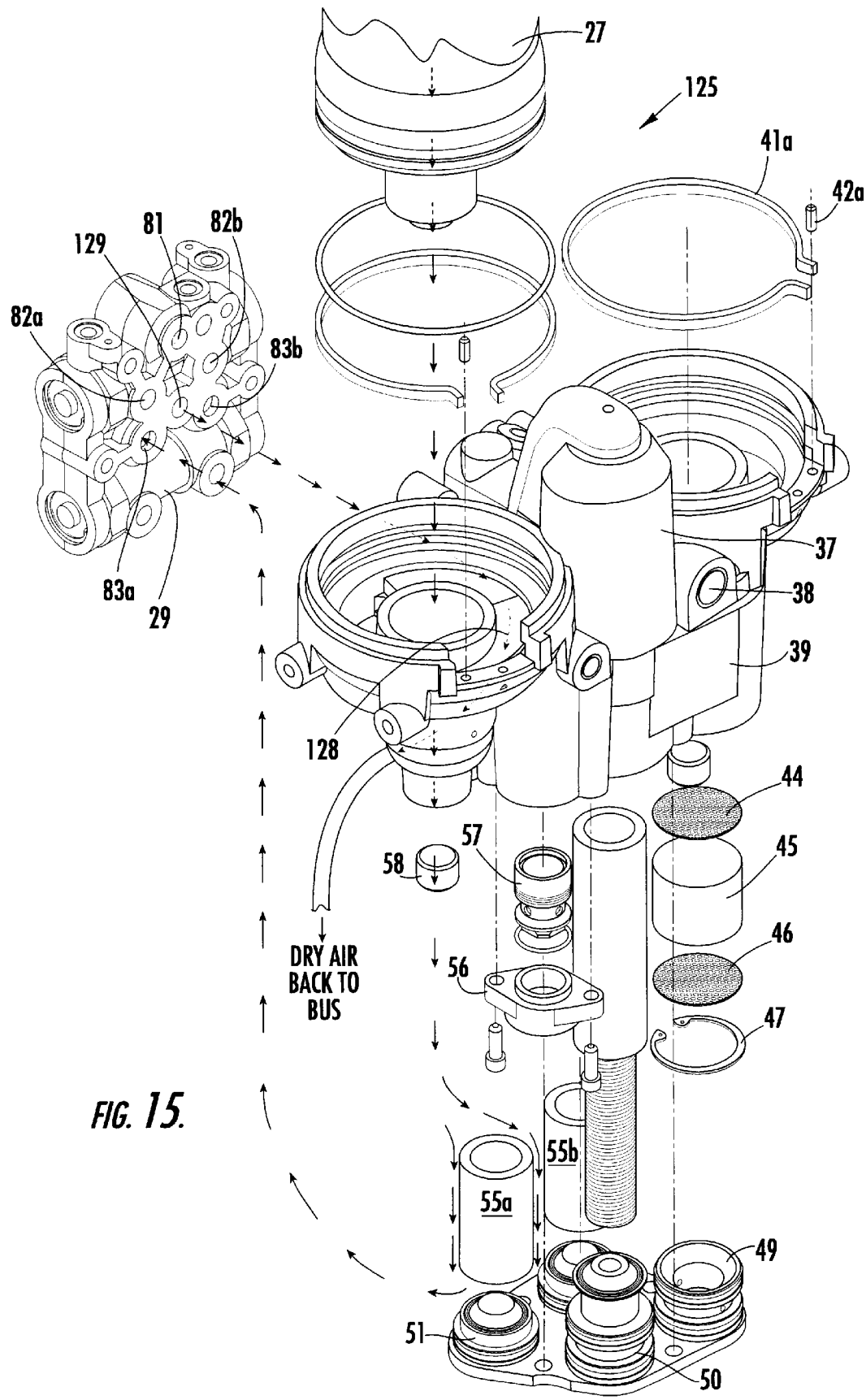
FIG. 15 reveals an air flow pathway from the valve body back into the dryer base, showing the pathway for dry air to proceed back into the pneumatic lines of a transit vehicle, such as a bus (for example)

FIG. 15 shows an air flow pathway from the valve body back into the dryer base, and indicates the pathway for dry air to proceed back into the pneumatic lines. In the Figure, air flow diagram 125 shows the flow of air from the second tower 27 through internal passageways in the dryer base 39 into the valve module 29. Air flows into the air return port 83*a* and flows out of the valve module 29 through the common outlet 129 back to the casting 37. Other ports or holes in the valve module 29, previously described, are shown in FIG. 15. Furthermore, dry air emerges from the casting 37 and returns back to the pneumatic lines of the bus or transit vehicle as shown near the center of FIG. 15, along the path of the arrows 128.

Figure 16:
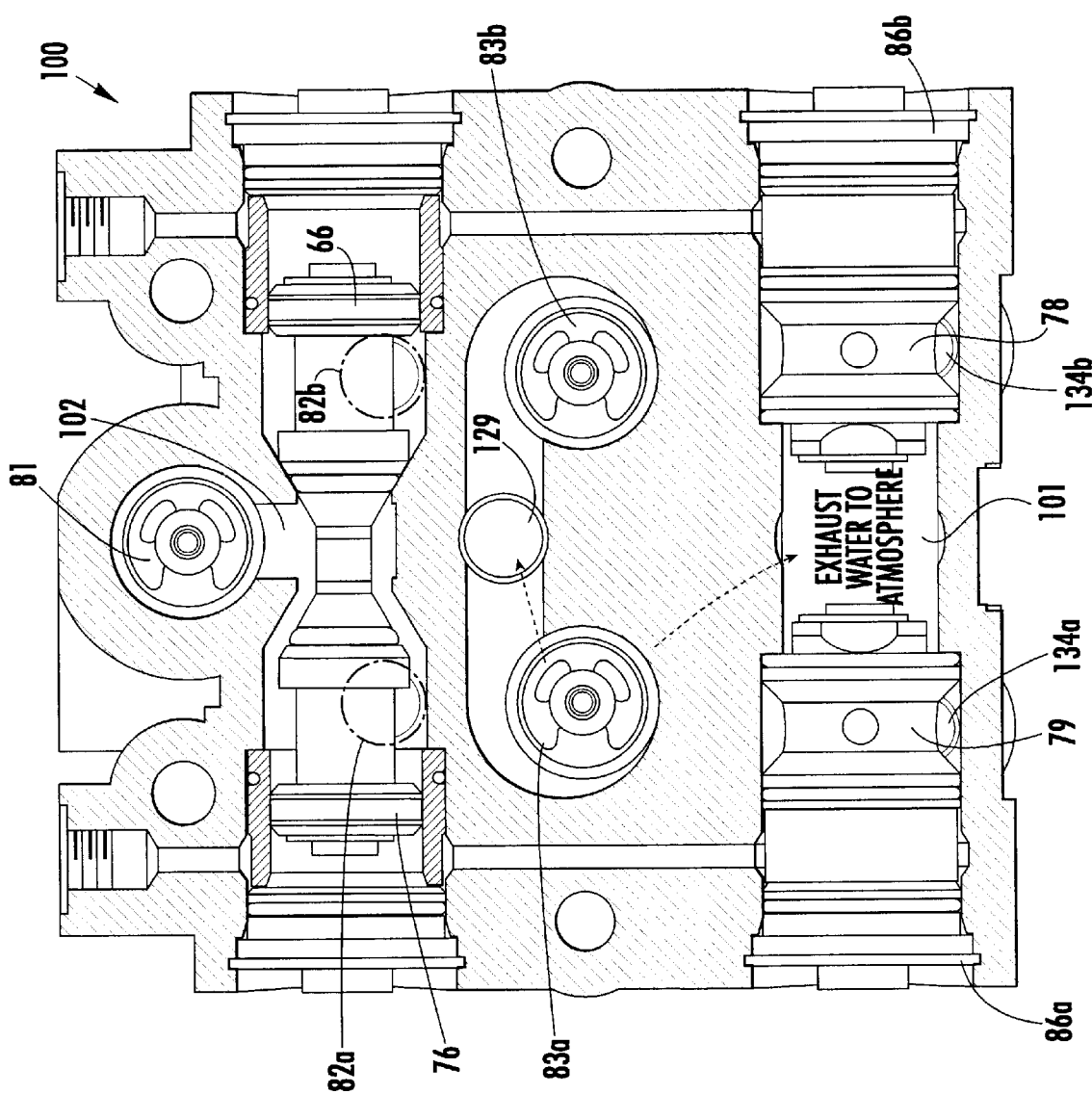
FIG. 16 is a further cross-sectional view of the valve body like that of FIG. 9, except it further shows the flow of air that has been dried by dessicant, and the pathway for water to be exhausted from the system.

In FIG. 16, a further cross-sectional view of the valve body is shown revealing the flow of air that has been dried by the dessicant in the towers, and the pathway for the water to be exhausted from the system. In FIG. 16, the cross-section 100 of the valve module is shown such that air is emerging from the common outlet 129 and is allowed to leak back through the outlet check valve. The sump 101 is shown between the first exhaust valve 78 and second exhaust valve 79, wherein exhaust water is ported out to the atmosphere which has been received along air return port 84a and 84b, respectively. Inlet plenum 102 is shown just below the air input 81, which comes from the base.

Figure 17:
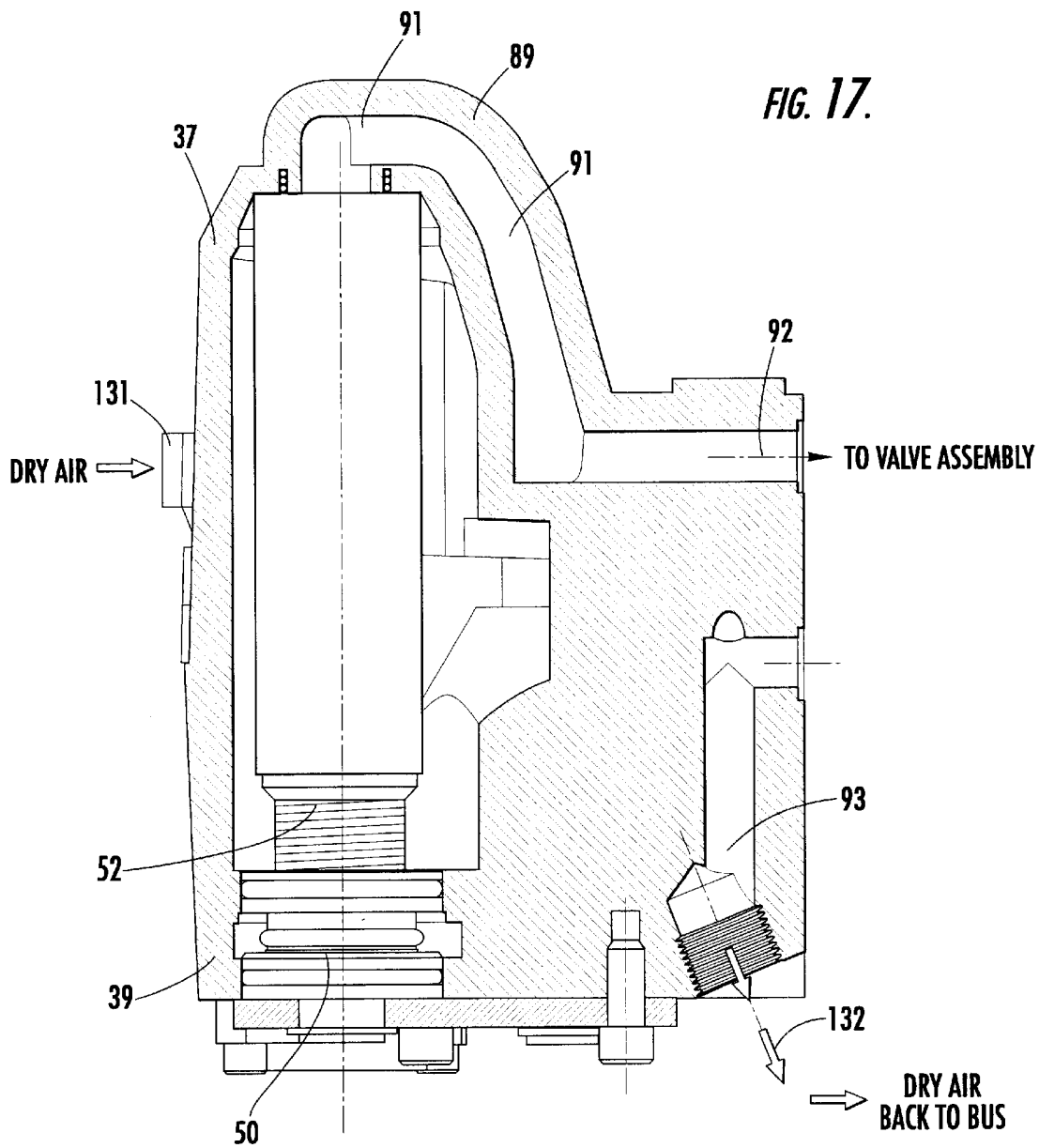
FIG. 17 is a cross-sectional view of the dryer base, showing air flow out to the valve assembly.

In FIG. 17, the cross-sectional view of the dryer base is shown, revealing the air flow out to the valve assembly. The cross-section is taken along the lines 7—7 as shown in FIG. 5. Air input 92 to the valve module 29 is shown in the upper portion of FIG. 17. Back port 92 provides dry air back to the pneumatic line of the bus or transit vehicle as shown in the lower right portion of FIG. 17, along air pathway 132. Dry air enters the assembly in the port 131 from the common outlet 129.

Figure 18:
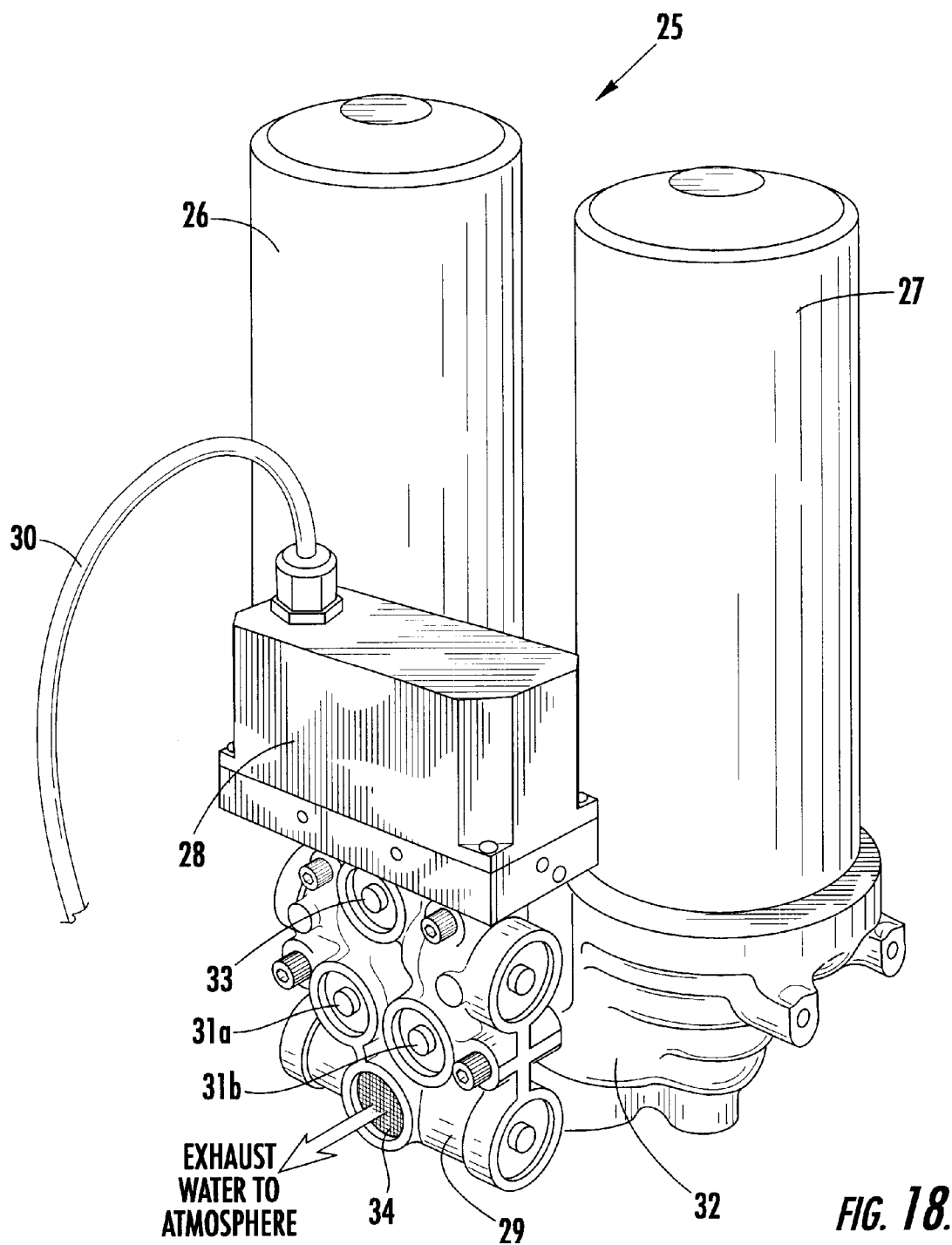
FIG. 18 is a perspective view showing the exhaustion of water to the atmosphere from the air dryer.

FIG. 18 is a view similar to the view in FIG. 1 except that it also shows the flow of exhaust water to the atmosphere out of the drain 34.

Figure 19:
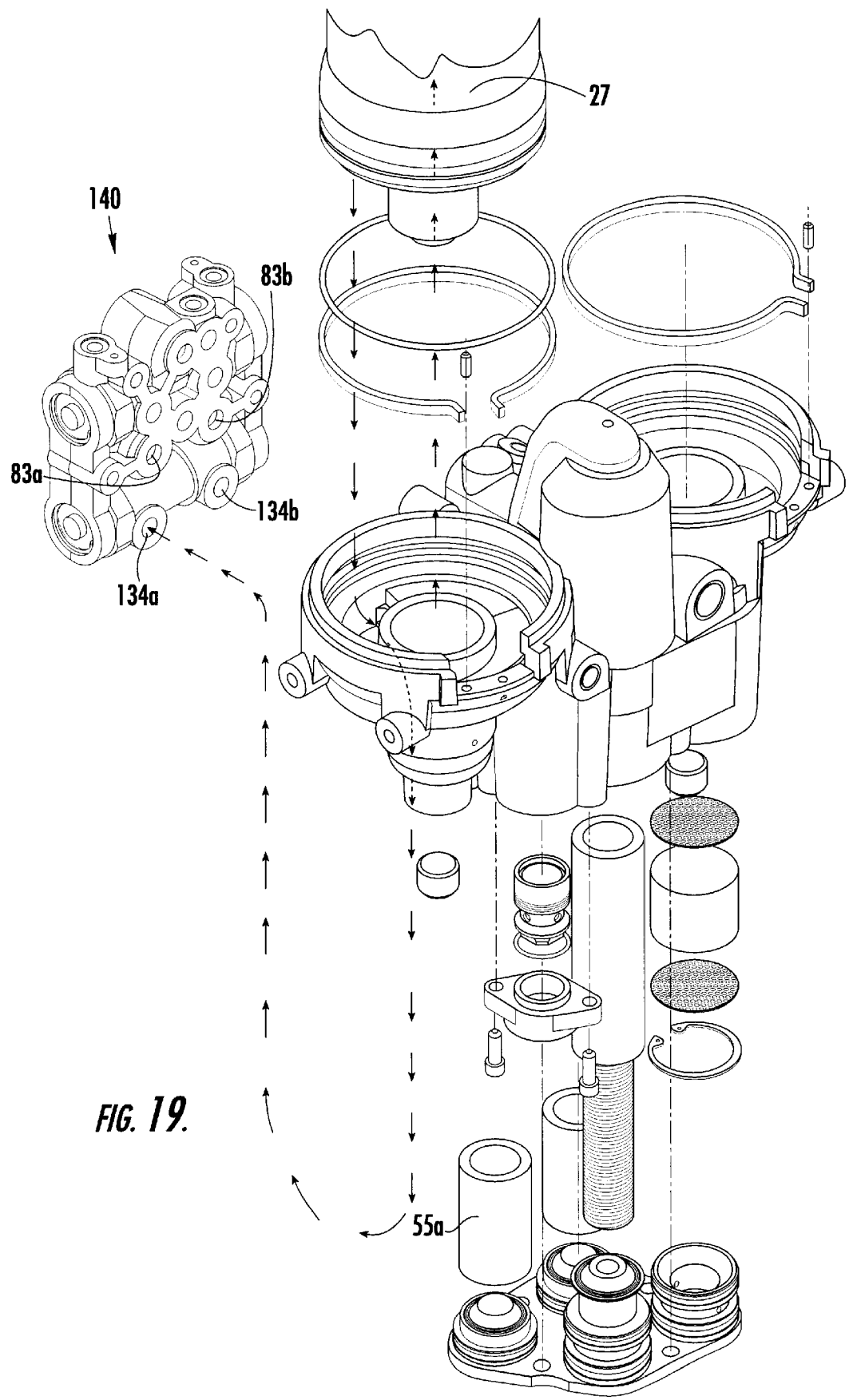
FIG. 19 shows the air flow path from the purge outlet of the valve body in the purge cycle to push air back through the dessicant of the tower.

FIG. 19 shows the purge cycle 140 which including air flow from the purge outlet 83a and up into the second tower 27, back around coalescing filter 55a to port 134a, in the purge cycle. Likewise, a similar purge cycle emerges from purge outlet 83b into the first tower (first tower not shown in FIG. 19).

Figure 20:
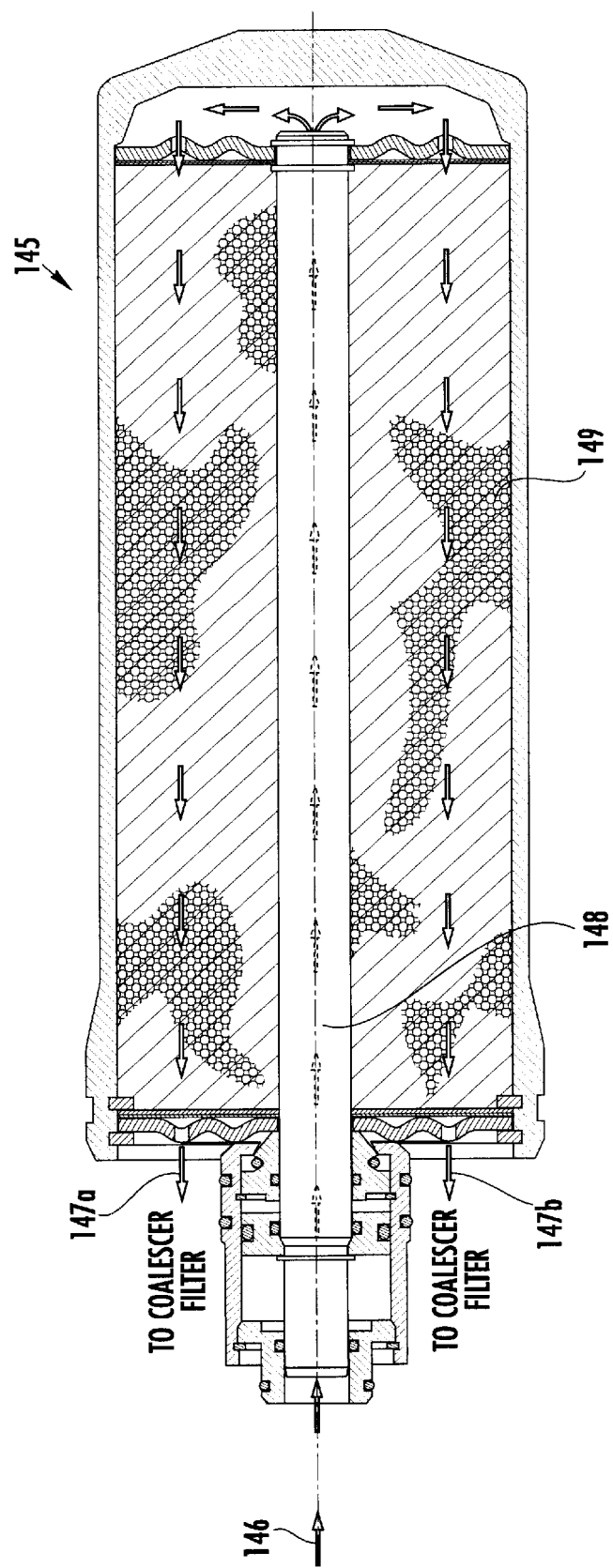
FIG. 20 is a view of the purge cycle air flow through the dessicant can.

FIG. 20 shows a view of the purge cycle air flow through the dessicant can. The purge cycle 145 of the tower is shown whereby purge air 146 comes into the center tube 148, to the top of the tower, and comes back down through the dessicant material 149 and out along purge air outputs 147a and 147b to the respective coalescer filters.

Figure 21:
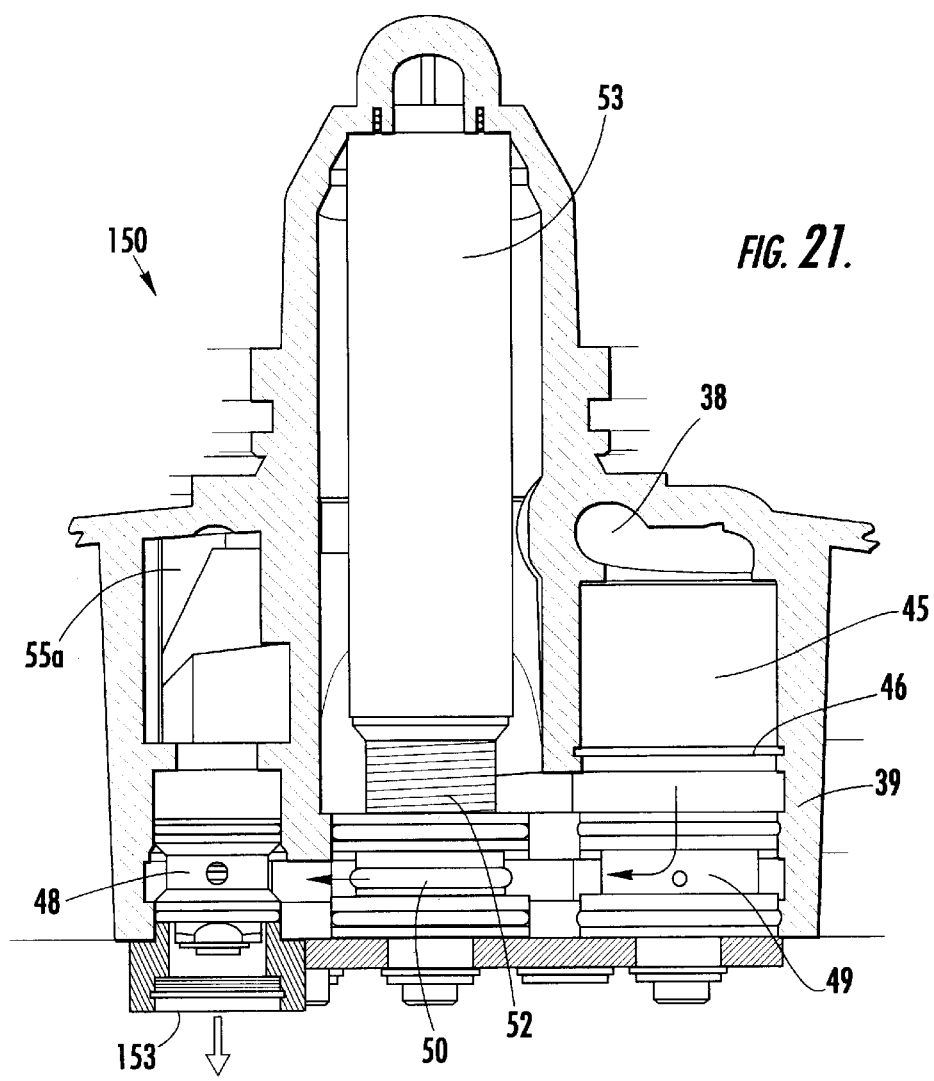
FIG. 21 shows a cross-sectional view of the dryer base taken along line 6—6 of FIG. 5, with arrows showing the venting of wet air to the atmosphere.

In FIG. 21, a compressor unload cycle is shown in which solid contaminants are expelled from the twin tower dryer 25 to the atmosphere.

Figure 22:
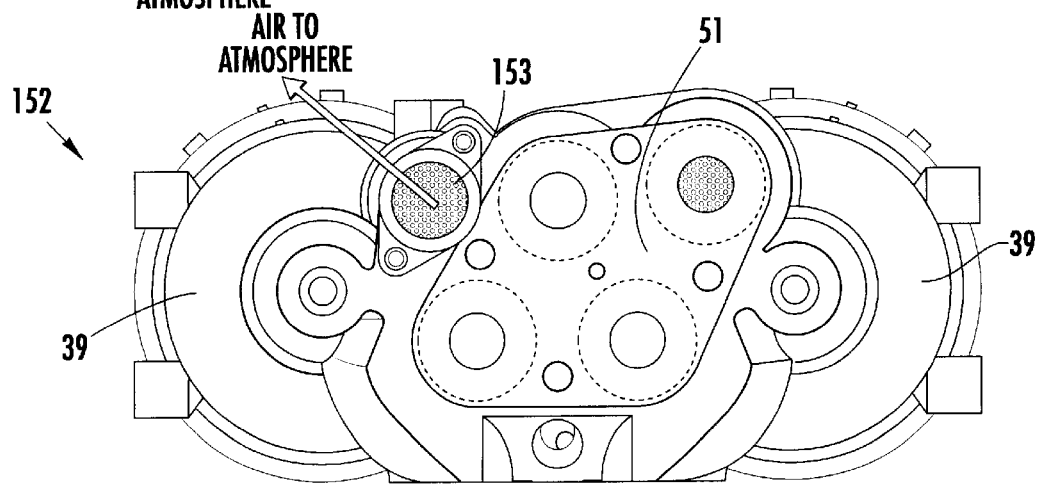
FIG. 22 is a bottom view of the air dryer showing an air exit point for moist air.

In FIG. 22, a bottom view 152 of the twin tower dryer 25 is shown in which the air is vented to the atmosphere at wet air purge 153.

In the invention, it is usually not necessary to cycle off the source of unpurified air to purge the air drying system of accumulated moisture. That is, in the invention the twin tower system efficiently manages the air stream to remove moisture from the system.

In the invention, the system continuously supplies purified air to the pneumatic system to which it is attached. Specifically, while one drying assembly of the twin tower system operates in the drying mode and supplies dry air to the pneumatic system, the other drying assembly operates in the purge mode and it is therein purged of moisture which was previously accumulated. After a predetermined time has elapsed, the system switches the latter drying assembly to the drying mode and the former drying assembly to the purge mode. This switching continues until the source of pressurized air ceases supplying unpurified air to the system. Thus, there is no need to deprive the pneumatic system of a steady supply of clean and dried compressed air while the system purges itself of moisture.

In the invention, switching the two drying assemblies between the drying and purging modes facilitates a twin tower that is capable of handling the air stream more efficiently than other systems. Thus, one tower or can containing dessicant absorbs moisture while the other tower or can is being purged of its accumulated moisture. Then, the switching of the two drying assemblies alternately between drying and purging modes serves to continuously purge moisture from the twin tower system. More fully desiccated air is thus supplied to the pneumatic system. The amount, density and overall surface area of the dessicant may be selected to suit the needs of the particular application to which it is applied.

In general, the system of the invention may be applied to pneumatic systems including pneumatic braking systems of passenger and freight railroad trains, subway trains, passenger buses, and various other types of related transportation systems. Further examples include the pneumatic brake systems of various truck transport vehicles. In general, the pneumatic air drying system of the invention could be applied to almost any air drying system, even those which are used or employed outside of the transportation field.

In the invention, various electronic control components of the system are housed in a single enclosure. A pneumatic control unit manages the switching. and purging cycles during the drying phase.

In systems which operate upon trucks and buses, extremely hot air temperatures may be encountered. That is, as the air or gas enters the drier, the temperature of the air is typically between about 205–210 degrees Fahrenheit, which represents a much higher temperature than other applications. For example, in a typical locomotive air brake application, the temperature of the air or gas entering the drier may be only about 120–130 degrees F. Thus, high temperatures associated with the pneumatic air output from trucks and buses may deteriorate non-metallic substances within the drier, such as the filtration apparatus.

Sometimes, it takes a larger charge of dessicant to dry the air at the higher temperatures. Small particles of carbon soot in the unpurified air may clog the filters, thereby causing the filters to burst or rupture.

It is understood by one of ordinary skill in the art that the present discussion is a description of exemplary embodiments only, and is not intended as limiting the broader aspects of the present invention, which broader aspects are embodied in the exemplary constructions. The invention is shown by example in the appended claims.

What is claimed is:

1. A twin tower gas drying system for purifying a gas stream, comprising:
   (a) a separation means for removing particulate material from a stream of unpurified gas;
   (b) a pre-filtering means for removing impurities from said stream of unpurified gas flowing from said separation means;
   (c) first and second coalescing filters capable of removing contaminants from said stream of unpurified gas flowing from said pre-filtering means;
   (d) a first tower having a first dessicant material therein for removing moisture from said stream of unpurified gas received from said first coalescing filter so as to supply a first stream of purified gas therefrom;
   (e) a second tower having a second dessicant material therein for removing moisture from said remaining stream of unpurified gas received from a second of said coalescing filters so as to supply a second stream of purified gas therefrom; and
   (f) a control means for controlling flow of said unpurified and purified streams of gases through said drying system such that said drying system is capable of alternately switching between supplying unpurified gas to said first tower and supplying unpurified gas to said second tower.

2. The drying system of claim 1 further wherein the control means operates to:

supply unpurified gas to said first tower while simultaneously purging moisture from the second dessicant material of said second tower.

3. The drying system of claim 2 wherein said control means operates to:

supply unpurified gas to said second tower while simultaneously purging moisture from the first dessicant material of said first tower.

4. The drying system of claim 1 wherein said separation means comprises a scrubber pad.

5. The drying system of claim 4 in which the scrubber pad is capable of operating in a first mode to entrain particulate material upon its surface and in a second mode to release entrained material from its surface, said entrained material being exhausted from the system.

6. The drying system of claim 5 in which the scrubber pad flexes in response to air pressure fluctuations to release entrained particulate material from its surface.

7. The drying system of claim 1 in which the control means comprises a valve.

8. The drying system of claim 1 in which said pre-filtering means comprises a hollow structure.

9. The drying system of claim 1 in which said first and second coalescing filters comprise hollow structures.

10. The drying system of claim 1 in which said first and second towers comprise first and second cans.

11. The drying system of claim 10 in which said first tower comprises a first holding means for containing said first dessicant material within said first can to minimize forces acting against the first can.

12. The drying system of claim 10 in which said second tower comprises a second holding means for containing said second dessicant material within said second can to minimize forces acting against the second can.

* * * * *